United States Patent
Hatanaka

(10) Patent No.: US 9,421,572 B2
(45) Date of Patent: Aug. 23, 2016

(54) OPTICALLY ABSORPTIVE ANISOTROPIC FILM, THREE-DIMENSIONAL OPTICALLY ABSORPTIVE ANISOTROPIC FILM AND METHOD FOR PRODUCING THE SAME

(71) Applicant: Sumitomo Chemical Company, Limited, Tokyo (JP)

(72) Inventor: Nobuyuki Hatanaka, Osaka (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 14/749,935

(22) Filed: Jun. 25, 2015

(65) Prior Publication Data

US 2015/0378068 A1     Dec. 31, 2015

(30) Foreign Application Priority Data

Jun. 25, 2014  (JP) .................... 2014-130094

(51) Int. Cl.
| | |
|---|---|
| *G02F 1/1335* | (2006.01) |
| *B05D 3/02* | (2006.01) |
| *G02B 5/30* | (2006.01) |
| *G02B 5/22* | (2006.01) |
| *G02B 1/04* | (2006.01) |

(52) U.S. Cl.
CPC .............. *B05D 3/0272* (2013.01); *G02B 5/223* (2013.01); *G02B 5/3016* (2013.01); *G02B 1/04* (2013.01)

(58) Field of Classification Search
CPC ............................ G02F 1/1334; Y10T 428/10
USPC ........................................... 349/96, 118, 194
See application file for complete search history.

(56) References Cited

U.S. PATENT DOCUMENTS

| | | |
|---|---|---|
| 7,763,330 B2 | 7/2010 | Lub et al. |
| 8,120,728 B2 | 2/2012 | Nakamura et al. |
| 2012/0008224 A1 | 1/2012 | Uchida |

FOREIGN PATENT DOCUMENTS

| | | |
|---|---|---|
| JP | 2010033050 A | 2/2010 |
| JP | 4719156 B2 | 7/2011 |
| JP | 2012033249 A | 2/2012 |
| JP | 2013101328 A | 5/2013 |

OTHER PUBLICATIONS

Lub et al., "The synthesis of liquid-crystalline diacrylates derived from cyclohexane units," Recueil des Travaux Chimiques des Pays-Bas, vol. 115, pp. 321-328 (1996).

*Primary Examiner* — Lucy Chien
(74) *Attorney, Agent, or Firm* — Panitch Schwarze Belisario & Nadel LLP

(57) ABSTRACT

An optically absorptive anisotropic film includes a dichroic dye. The light absorbances of the film satisfy the formulas (1), (2) and (3):

$$Az > (Ax+Ay)/2 \qquad (1)$$

$$Ax(z=60)/Ax > 5 \qquad (2)$$

$$Ay(z=60)/Ay > 5 \qquad (3)$$

wherein Ax, Ay, Az, Ax (z=60) and Ay (z=60) are absorbances at a local maximum absorption wavelength of the dichroic dye; Ax, Ay and Az represent an absorbance of linearly polarized light vibrating in the direction of the x-axis, y-axis and z-axis, respectively; Ax (z=60) represents an absorbance of the linearly polarized light vibrating in the direction of the x-axis in the state of the film rotated by 60° around the y-axis; and Ay (z=60) represents an absorbance of the linearly polarized light vibrating in the direction of the y-axis in the state the film rotated by 60° around the x-axis.

16 Claims, 1 Drawing Sheet

OPTICALLY ABSORPTIVE ANISOTROPIC FILM, THREE-DIMENSIONAL OPTICALLY ABSORPTIVE ANISOTROPIC FILM AND METHOD FOR PRODUCING THE SAME

BACKGROUND OF THE INVENTION

1. Field of the Invention

The present invention relates to an optically absorptive anisotropic film, a three-dimensional optically absorptive anisotropic film and a method for producing the same.

2. Description of the Related Art

JP-A-2010-033050 describes a polarizing plate characterized in that it has a polarizing layer having a K value as defined by K=(kx−kz)/(kx−ky) of 0.25 to 0.75 (axes orthogonal to each other in a plane of a polarizing layer are an x-axis and a y-axis, respectively, an axis orthogonal to an x-y axis plane is a z-axis, and kx, ky and kz are an absorption coefficient of each of the x-axis, y-axis and z-axis directions). That is, it is a polarizing plate satisfying the relationship of kx>kz>ky and K=0.25 to 0.75, and in the polarizing plate, a dichroic dye has orientation inclined to a film plane.

Specifically, a polarizing plate including the following liquid crystals 1 and 2 and a black dichroic dye S-344 manufactured by Mitsui Toatsu Chemicals Inc. as the dichroic dye is made, and a polarizing plate including a polarizing layer having values of kx=0.111, ky=0.001 and kz=0.059 is obtained.

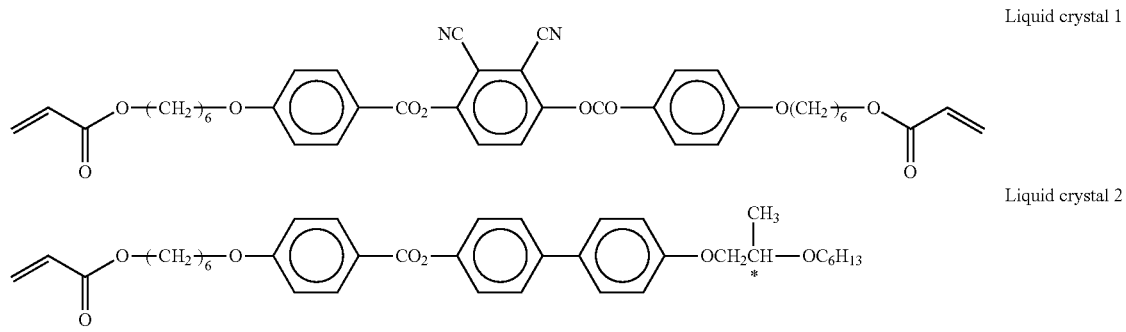

* represents an asymmetric carbon atom

SUMMARY OF THE INVENTION

Since the above polarizing film is insufficient in orientational order in the vertical orientation, there are problems that light from the front direction is not sufficiently transmitted and light from an oblique direction is not sufficiently absorbed. Then, a thin optically absorptive anisotropic film has been demanded which can be conveniently produced and which imparts a more effective peep preventing function to a display of a cellular phone, bank ATM, etc.

The present invention includes the following aspects.

[1] An optically absorptive anisotropic film comprising a dichroic dye and a liquid crystalline compound, wherein when an arbitrary direction in the film plane is defined as an x-axis, the axis orthogonal to the x-axis in the film plane is defined as a y-axis, and the axis orthogonal to the x-axis and the y-axis is defined as a z-axis, light absorbances of the film satisfy the formulas (1), (2) and (3):

$$Az > (Ax+Ay)/2 \quad (1)$$

$$Ax(z=60)/Ax > 5 \quad (2)$$

$$Ay(z=60)/Ay > 5 \quad (3)$$

wherein Ax, Ay, Az, Ax (z=60) and Ay (z=60) are absorbances at a local maximum absorption wavelength of the dichroic dye contained in the optically absorptive anisotropic film;

Ax represents an absorbance of linearly polarized light vibrating in the direction of the x-axis;

Ay represents an absorbance of linearly polarized light vibrating in the direction of the y-axis;

Az represents an absorbance of linearly polarized light vibrating in the direction of the z-axis;

Ax (z=60) represents an absorbance of the linearly polarized light vibrating in the direction of the x-axis in the state of the film rotated by 60° around the y-axis; and Ay (z=60) represents an absorbance of the linearly polarized light vibrating in the direction of the y-axis in the state of the film rotated by 60° around the x-axis.

[2] The optically absorptive anisotropic film according to [1], wherein the liquid crystalline compound forms a smectic liquid crystal phase.

[3] The optically absorptive anisotropic film according to [1] or [2], wherein the liquid crystalline compound forms a high order smectic liquid crystal phase.

[4] The optically absorptive anisotropic film according to any one of [1] to [3], wherein the optically absorptive anisotropic film exhibits a Bragg peak in X-ray diffraction measurement.

[5] The optically absorptive anisotropic film according to any one of [1] to [4], wherein the local maximum absorption wavelength of the dichroic dye contained in the optically absorptive anisotropic film is in a wavelength range of 500 to 600 nm.

[6] The optically absorptive anisotropic film according to any one of [1] to [5], wherein the optically absorptive anisotropic film satisfies the formulas (4) and (5), $$Ax(z=60)/Ax > 10 \quad (4)$$

$$Ay(z=60)/Ay > 10 \quad (5).$$

[7] The optically absorptive anisotropic film according to any one of [1] to [6], wherein the optically absorptive anisotropic film comprising at least three dichroic dyes differing in a local maximum absorption wavelength.

[8] The optically absorptive anisotropic film according to any one of [1] to [7], wherein the optically absorptive anisotropic film has a thickness of 5 μm or less.

[9] An optical film comprising the optically absorptive anisotropic film according to any one of [1] to [8] and a substrate.

[10] The optical film according to [9], wherein the optical film has no orientation film between the optically absorptive anisotropic film and the substrate.

[11] A method for producing the optical film according to [9] or [10], the method comprising the following steps of (1), (2), (3) and (4) to be performed in this order:

(1) a step of forming a coating layer by coating a substrate with a composition comprising the liquid crystalline compound, the dichroic dye and a solvent;
(2) a step of forming a dried layer by removing the solvent from the coating layer;
(3) a step of developing a liquid crystal phase by cooling the dried layer; and
(4) a step of curing the liquid crystalline compound by applying active energy rays.

[12] The method according to [11], wherein an elongated film is used as the substrate and the optical film is produced continuously.

[13] A three-dimensional optically absorptive anisotropic film in which the optically absorptive anisotropic film according to any one of [1] to [8] is laminated together with a horizontal polarizing film, wherein
when an absorption axis of the horizontal polarizing film is defined as an x'-axis, a transmission axis of the horizontal polarizing film is defined as a y'-axis, and the axis orthogonal to the x'-axis and the y'-axis is defined as a z'-axis, the three-dimensional optically absorptive anisotropic film satisfies the formula (6):

$$Ax' > Az' > Ay' \quad (6)$$

wherein Ax', Ay' and Az' are an absorbances at a local maximum absorption wavelength of the dichroic dye contained in the optically absorptive anisotropic film;
Ax' represents an absorbance of linearly polarized light vibrating in the direction of the x'-axis;
Ay' represents an absorbance of linearly polarized light vibrating in the direction of the y'-axis; and
Az' represents an absorbance of linearly polarized light vibrating in the direction of the z'-axis.

[14] The three-dimensional optically absorptive anisotropic film according to [13], wherein the horizontal polarizing film comprises a polyvinyl alcohol and a dichroic dye.

[15] The three-dimensional optically absorptive anisotropic film according to [13], wherein the horizontal polarizing film comprises a dichroic dye and a liquid crystalline compound, or comprises a dichroic dye having liquid crystalline properties.

[16] The three-dimensional optically absorptive anisotropic film according to any one of [13] to [15], wherein the optically absorptive anisotropic film is laminated on the horizontal polarizing film via a pressure-sensitive adhesive or an adhesive.

The optically absorptive anisotropic film of the present invention is useful for obtaining a thin optically absorptive anisotropic film which can be conveniently produced and which imparts a peep preventing function to a display of a cellular phone, bank ATM, etc.

DETAILED DESCRIPTION OF THE PREFERRED EMBODIMENTS

Figure 1:
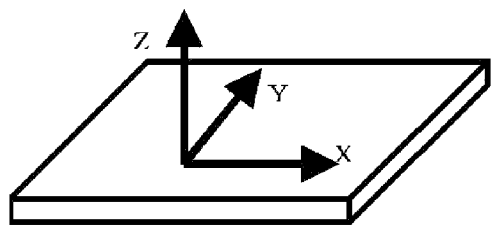
FIG. 1 is a perspective view of the present optically absorptive anisotropic film.

<Optically Absorptive Anisotropic Film>
An optically absorptive anisotropic film contains a dichroic dye. The optically absorptive anisotropic film of the present invention contains a dichroic dye and a liquid crystalline compound.

The present optically absorptive anisotropic film satisfies all of the formulas (1), (2) and (3) when an arbitrary direction in a film plane is defined as an x-axis, the axis orthogonal to the x-axis in the filmplane is defined as a y-axis, and the axis orthogonal to the x-axis and the y-axis is defined as a z-axis:

$$Az > (Ax+Ay)/2 \quad (1)$$

$$Ax(z=60)/Ax > 5 \quad (2)$$

$$Ay(z=60)/Ay > 5 \quad (3)$$

Herein, Ay, Az, Ax (z=60) and Ay (z=60) are absorbances at the local maximum absorption wavelength of the dichroic dye contained in the optically absorptive anisotropic film.

Ax represents an absorbance of linearly polarized light vibrating in the direction of the x-axis. Ax can be measured when linearly polarized light vibrating in an x-axis direction is made incident to a film plane from a z-axis direction. Ay represents an absorbance of linearly polarized light vibrating in the direction of the y-axis. Ay can be measured when linearly polarized light vibrating in a y-axis direction is made incident to a film plane from the z-axis direction. Az represents an absorbance of linearly polarized light vibrating in the direction of the z-axis. Az can be measured when linearly polarized light vibrating in the z-axis direction is made incident vertically, from an x-y plane direction, to a film side plane, that is, to a side plane of the film (thickness direction) when the film is defined as an x-y plane. Ax (z=60) represents an absorbance of the linearly polarized light vibrating in the direction of the x-axis in the state of the film rotated by 60° around the y-axis. Ax (z=60) can be measured when the same linearly polarized light as that when Ax is measured is made incident in the state where the film is rotated by 60° around the y-axis. Herein, the rotation of the film is performed by rotating by 60° around the y-axis from the state where Ay is measured mentioned above. Ay (z=60) represents an absorbance of the linearly polarized light vibrating in the direction of the y-axis in the state of the film rotated by 60° around the x-axis. Ay (z=60) can be measured when the same linearly polarized light as that when Ay is measured is made incident in the state where the film is rotated by 60° around the x-axis. Herein, the rotation of the film is performed by rotating by 60° around the x-axis from the state where Ay is measured mentioned above.

The absorbance in the z direction in the formula (1) is difficult to be measured due to light incidence from the film side plane. Then, when the angle between the vibration plane of the linearly polarized light and the x-y plane of the film is 90°, the absorbance in the Az direction can be estimated by measurement with tilting the x-y plane of the film by 30° and 60°, toward the direction entering the linearly polarized light, relative to the vibration plane of the linearly polarized light as measurement light.

Specifically, the absorbance can be estimated by the following method or the like.

Ax (z=30) and Ax (z=60) are measured in such a manner that the same linearly polarized light with the linearly polarized light which used in measuring Ax is made incident in the state of the film rotated by 30° and 60° around the y-axis, toward the direction entering the linearly polarized light, and similarly, Ay (z=30) and Ay (z=60) are measured in such a manner that the same linearly polarized light with the linearly polarized light which used in measuring Ay is made incident in the state of the film rotated by 30° and 60° around the x-axis toward the direction entering the linearly polarized light.

In this case, when Ax (z=30)<Ax (z=60) and Ay (z=30)=Ay (z=60) are satisfied, Ax (z=30)<Ax (z=60)<Ax (z=90)=Az, and when Ay (z=30)<Ay (z=60) and Ax (z=30)=Ax (z=60) are satisfied, Ay (z=30)<Ay (z=60)<Ay (z=90)=Az, so that the formula (1) is necessarily satisfied.

Particularly, when there is no absorption anisotropy on the x-y plane, that is, when Ax is equal to Ay, since Ax (z=30)=Ay (z=30) and Ax (z=60)=Ay (z=60) are satisfied, Ax (z=30) and Ay (z=30) can be regarded as A(z=30), and Ax (z=60) and Ay (z=60) can be regarded as A(z=60). That is, if A(z=30)<A(z=60), the relationship of A(z=30)<A(z=60)<A(z=90)=Az is satisfied. Further, if A(z=30)>(Ax+Ay)/2, Az necessarily satisfies the formula (1).

The optically absorptive anisotropic film of the present invention satisfies the mentioned formulas (2) and (3). The larger the numerical values of Ax(Z=60)/Ax and Ay(Z=60)/Ay indicate more excellent optically absorptive anisotropic properties. The numerical values, for example, may be 50 or less or may be 30 or less.

The optically absorptive anisotropic film of the present invention satisfies the formulas (4) and (5) preferably.

$$Ax(z=60)/Ax>10 \quad (4)$$

$$Ay(z=60)/Ay>10 \quad (5)$$

When the optically absorptive anisotropic film satisfies the formulas (1), (2) and (3), the dichroic dye has excellent absorption anisotropy, that is, excellent polarizing performance. Due to this excellent property, light from the front direction can be effectively transmitted, and light from an oblique direction can be effectively absorbed.

The thickness of the present optically absorptive anisotropic film is preferably 0.1 to 10 μm, further preferably 1 to 5 μm. If the thickness of the present optically absorptive anisotropic film is less than 0.1 μm, absorption of light from an oblique direction becomes weak, so that a favorable peep preventing property is not obtained. If the thickness is 10 μm or more, orientation of the dichroic dye is disturbed, so that there is a problem that the transmission property in the front direction is deteriorated.

<Dichroic Dye>

A dichroic dye refers to a dye having a characteristic that an absorbance in the long axis direction of a molecule and an absorbance in the short axis direction thereof are different from each other.

As the dichroic dye, a dichroic dye have an local maximum absorption wavelength (λ MAX) in a range of 300 to 700 nm preferably, more preferably in a wavelength range of 500 to 600 nm. According to the dichroic dye having the local maximum absorption wavelength in a range of 500 to 600 nm where spectral luminous efficacy of human is high, it can prevent a peeping more sufficiently. Thus, when there is used the dichroic dye having the local maximum absorption wavelength in the range where spectral luminous efficacy of human is high, the used amount of the dichroic dye can be reduced and the optically absorptive anisotropic film can be thinner.

Examples of such a dichroic dye include an acridine dye, an oxazine dye, a cyanine dye, a naphthalene dye, an azo dye, an anthraquinone dye, etc., and among them, an azo dye is preferable. Examples of the azo dye include a monoazo dye, a bisazo dye, a trisazo dye, a tetrakisazo dye, a stilbeneazo dye, etc., preferably a bisazo dye and a trisazo dye. The dichroic dyes may be used alone, or may be used in combination, but when the polarizing property is required over the entire visible light region, it is preferable to combine three or more kinds of dichroic dyes, and it is more preferable to combine three or more kinds of azo dyes.

When some dichroic dyes are combined, preferred is to comprise at least one kind of the dichroic dye, contained in the optically absorptive anisotropic film, having the local maximum absorption wavelength in a range of 500 nm to 600 nm. When two dichroic dyes are combined, more preferred is to include further the dichroic dye having the local maximum absorption wavelength in a range of 350 nm to 499 nm or in a range of 601 to 750 nm. When three dichroic dyes are combined, more preferred is to include the dichroic dyes having the local maximum absorption wavelength in a range of 350 nm to 499 nm, in a range of 500 nm to 600 nm or in a range of 601 nm to 750 nm, respectively. By such combination, a peeping can be prevented more sufficiently.

Examples of the azo dye include compounds represented by the formula (2) (hereinafter, may be referred to as "compound (2)"):

$$A^1(-N=N-A^2)P-N=N-A^3 \quad (2)$$

in the formula (2), $A^1$ and $A^3$ each independently represent an optionally substituted phenyl group, an optionally substituted naphthyl group or an optionally substituted monovalent heterocyclic group; $A^2$ represents an optionally substituted 1,4-phenylene group, an optionally substituted naphthalene-1,4-diyl group or an optionally substituted divalent heterocyclic group; p represents an integer of 1 to 4; and if p is an integer of 2 more, a plurality of $A^2$s may be the same or different from one another.

Examples of the monovalent heterocyclic group include groups in which one hydrogen atom is removed from heterocyclic compounds such as quinoline, thiazole, benzothiazole, thienothiazole, imidazole, benzimidazole, oxazole and benzoxazole. Examples of the divalent heterocyclic group include groups in which two hydrogen atoms are removed from the above heterocyclic compounds.

Examples of the substituent which is arbitrarily possessed by a phenyl group, a naphthyl group and a monovalent heterocyclic group in $A^1$ and $A^3$, as well as a 1,4-phenylene group, a naphthalene-1,4-diyl group and a divalent heterocyclic group in $A^2$ include alkyl groups with a carbon number of 1 to 4 such as a methyl group, an ethyl group and a butyl group; alkoxy groups with a carbon number of 1 to 4 such as a methoxy group, an ethoxy group and a butoxy group; fluorinated alkyl groups with a carbon number of 1 to 4 such as a trifluoromethyl group; a cyano group; a nitro group; halogen atoms such as a chlorine atom and a fluorine atom; substituted and unsubstituted amino groups such as an amino group, a diethylamino group and a pyrrolidine group (the substituted amino group means an amino group having one or two alkyl groups with a carbon number of 1 to 6, or an amino group in which two substituted alkyl groups are bound with each other to form an alkanediyl group with a carbon number of 2 to 8; and the unsaturated amino group is $-NH_2$). Examples of the alkyl group with a carbon number of 1 to 6 include a methyl group, an ethyl group, a hexyl group, etc. Examples of the alkanediyl group with a carbon number of 2 to 8 include an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,8-diyl group, etc.

Among the compound (2), compounds represented by the following formula (2-1) to the formula (2-6), respectively, are preferable.

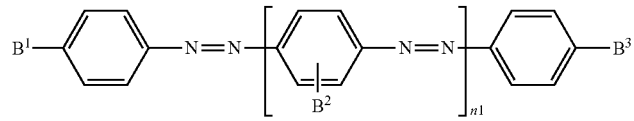

(2-1)

-continued

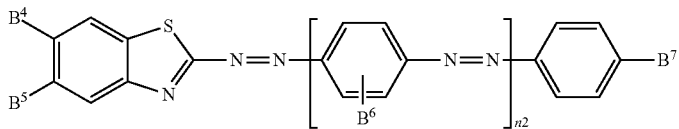
(2-2)

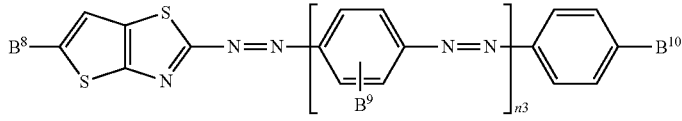
(2-3)

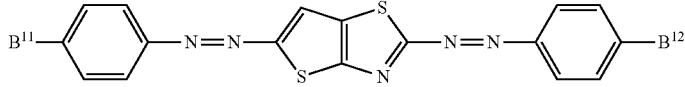
(2-4)

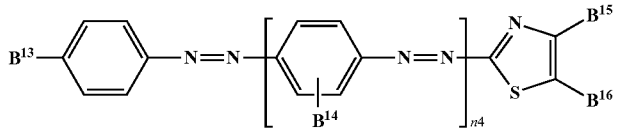
(2-5)

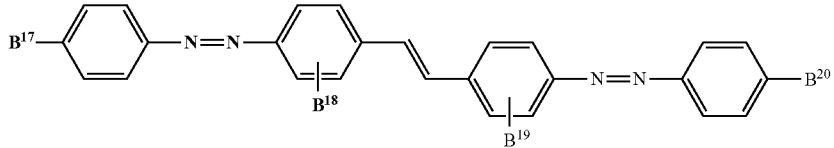
(2-6)

In the formulas (2-1) to (2-6), $B^1$ to $B^{20}$ each independently represent a hydrogen atom, an alkyl group with a carbon number of 1 to 4, an alkoxy group with a carbon number of 1 to 4, a cyano group, a nitro group, a substituted or unsubstituted amino group (definition of the substituted amino group and the unsubstituted amino group is as described above), a chlorine atom or a trifluoromethyl group;

n1 to n4 each independently represent an integer of 0 to 3;

if n1 is 2 or more, a plurality of $B^2$s may be the same or different from one another;

if n2 is 2 or more, a plurality of $B^6$s may be the same or different from one another;

if n3 is 2 or more, a plurality of $B^9$s may be the same or different from one another; and if n4 is 2 or more, a plurality of $B^{14}$s may be the same or different from one another.

As the anthraquinone dye, a compound represented by the formula (2-7) is preferable:

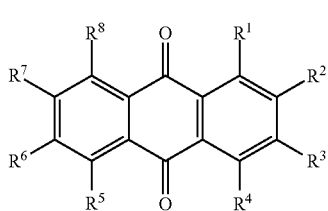
(2-7)

in the formula (2-7), $R^1$ to $R^8$ each independently represent a hydrogen atom, $-R^x$, $-NH_2$, $-NHR^x$, $-NR^x{}_2$, $-SR^x$ or a halogen atom; and $R^x$ represents an alkyl group with a carbon number of 1 to 4 or an aryl group with a carbon number of 6 to 12.

As the oxazine dye, a compound represented by the formula (2-8) is preferable:

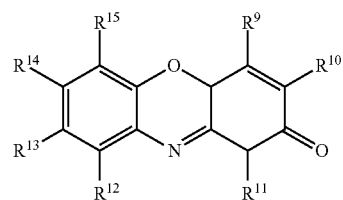
(2-8)

in the formula (2-8), $R^9$ to $R^{15}$ each independently represent a hydrogen atom, $-R^x$, $-NH_2$, $-NHR^x$, $-NR^x{}_2$, $-SR^x$ or a halogen atom; and $R^x$ represents an alkyl group with a carbon number of 1 to 4 or an aryl group with a carbon number of 6 to 12.

As the acridine dye, a compound represented by the formula (2-9) is preferable:

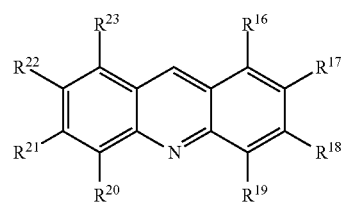
(2-9)

in the formula (2-9), $R^{16}$ to $R^{23}$ each independently represent a hydrogen atom, $-R^x$, $-NH_2$, $-NHR^x$, $-NR^x{}_2$, $-SR^x$ or a halogen atom; and $R^x$ represents an alkyl group with a carbon number of 1 to 4 or an aryl group with a carbon number of 6 to 12.

Examples of the alkyl group with a carbon number of 1 to 4 represented by $R^x$, in the formula (2-7), the formula (2-8) and the formula (2-9), include a methyl group, an ethyl group, a propyl group, a butyl group, etc., and examples of the aryl group with a carbon number of 6 to 12 include a phenyl group, a toluyl group, a xylyl group, a naphthyl group, etc.

As the cyanine dye, a compound represented by the formula (2-10) and a compound represented by the formula (2-11) are preferable:

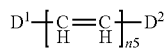

(2-10)

in the formula (2-10), $D^1$ and $D^2$ each independently represent a group represented by any of the formula (2-10a) to the formula (2-10d);

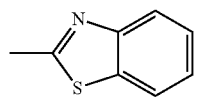

(2-10a)

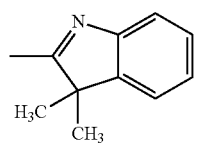

(2-10b)

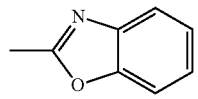

(2-10c)

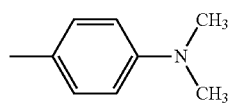

(2-10d)

and n5 represents an integer of 1 to 3.

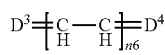

(2-11)

in the formula (2-11), $D^3$ and $D^4$ each independently represent a group represented by any of the formula (2-11a) to the formula (2-11h);

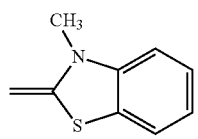

(2-11a)

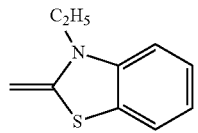

(2-11b)

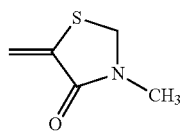

(2-11c)

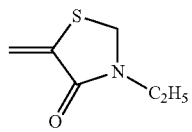

(2-11d)

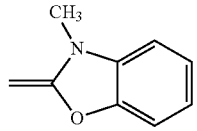

(2-11e)

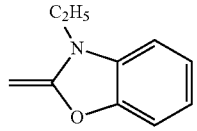

(2-11f)

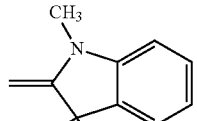

(2-11g)

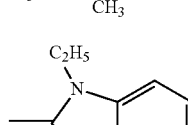

(2-11h)

and n6 represents an integer of 1 to 3.

From the viewpoint of making orientation of the dichroic dye good, the content of the dichroic dye in the optically absorptive anisotropic film is preferably 0.1 parts by mass or more and 30 parts by mass or less, more preferably 0.1 parts by mass or more and 20 parts by mass or less, further preferably 0.1 parts by mass or more and 10 parts by mass or less, particularly preferably 0.1 parts by mass or more and 5 parts by mass or less, based on 100 parts by mass of the solid content of the optically absorptive anisotropic composition. If the content of the dichroic dye falls within this range, the liquid crystal orientation of the liquid crystalline compound is favorably difficult to be disturbed.

<Substrate>

The present optically absorptive anisotropic film can be formed by a method for coating a substrate with a composition containing a dichroic dye (hereinafter, may be referred to as the present optically absorptive anisotropic composition), etc.

The substrate may be a glass substrate or a resin substrate, preferably a resin substrate.

When the resin substrate is transferred and is not peeled, a transparent resin substrate is preferable. The transparent resin substrate means a substrate having translucency which can transmit light, particularly visible light, and the translucency refers to a property such that the luminous degree of transmittance to light rays over a wavelength of 380 nm to 780 is 80% or more.

Examples of the resin constituting the substrate may include polyolefins such as polyethylene, polypropylene and norbornene-type polymer; cyclic olefin-type resin; polyvinyl alcohol; polyethylene terephthalate; polymethacrylic acid ester; polyacrylic acid ester; cellulose esters such astriacetyl cellulose, diacetyl cellulose and cellulose acetate propionate; polyethylene naphthalate; polycarbonate; polysulfone; polyether sulfone; polyether ketone; polyphenylene sulfide; polyphenylene oxide; etc. Preferred are cellulose ester, cyclic olefin-type resin, polycarbonate, polyether sulfone, polyethylene terephthalate and polymethacrylic acid ester.

A cellulose ester is cellulose in which at least a part of hydroxyl group in cellulose is esterified, and the cellulose ester is made available in markets. A substrate containing a cellulose ester is also made available in markets. Examples of the commercially available cellulose ester-containing substrate may be Fujitack (registered trademark) film (Fujifilm Corporation), KC8UX2M (Konica Minolta Opto Products Co., Ltd.), KC8UY (KONICAMINOLTA, INC.), KC4UY (KonicaMinolta Opto Products Co., Ltd.), etc.

A cyclic olefin-type resin may include polymers of cyclic olefins such as norbornene and polycyclic norbornane-type monomers and copolymers thereof. The cyclic olefin-type resin may have an open-ring structure, or may be a hydrogenated cyclic olefin-type resin having an open-ring structure. The cyclic olefin-type resin may contain a structural unit derived from a chain olefin and an aromatic vinyl compound to an extent that the transparency is not significantly deteriorated and hygroscopicity is not significantly increased. The cyclic olefin-type resin may have a polar group in its molecule.

Examples of the chain olefin include ethylene and propylene, and examples of the aromatic vinyl compound include styrene, $\alpha$-methylstyrene, alkyl-substituted styrene, etc.

When the cyclic olefin-based resin is a copolymer of cyclic olefin with chain olefin or aromatic vinyl compound, the content of the structural unit derived from the cyclic olefin is usually 50 mol % or lower and preferably 15 to 50 mol % in the entire structure units of the copolymer.

When the cyclic olefin-based resin is a terpolymer of cyclic olefin, chain olefin, and aromatic vinyl compound, the content of the structural unit derived from the chain olefin is usually 5 to 80 mol % in the entire structure units of the terpolymer and the content of the structural unit derived from the aromatic vinyl compound is usually 5 to 80 mol % in the entire structure units of the terpolymer. The terpolymer has an advantage such that the use amount of cyclic olefin with high cost can be relatively lowered.

The cyclic olefin-based resin is available from the market. Examples of the commercially available cyclic olefin-based resin include Topas (registered trademark) (Ticona (Germany)), Arton (registered trademark) (JSR Corporation), ZEONOR (registered trademark) (ZEON Corporation), ZEONEX (registered trademark) (ZEON Corporation), APEL (registered trademark) (Mitsui Chemicals, Inc.), etc. The cyclic olefin-type resin may be formed into a film by a conventionally known method such as a solvent casting method or a melt extrusion method to obtain a substrate. Examples of the commercially available substrate containing a cyclic olefin-based resin include ESCENA (registered trademark) (Sekisui Chemical Co., Ltd.), SCA40 trademark) (SekisuiChemical Co., Ltd.), ZEONORFilm (registered trademark) (Optes Inc.), Arton Film (registered trademark) (JSR Corporation), etc.

The substrate may be subjected to surface treatment. Examples of method for the surface treatment may include a method for treating the substrate surface with corona or plasma under an atmosphere from vacuum to atmospheric pressure; a method for treating the substrate surface with laser; a method for treating the substrate surface with ozone; a method for treating the substrate surface by saponification; a method for treating the substrate surface with flame; a method for coating the substrate surf ace with a coupling agent; a method for treating the substrate surface with primer; a graft polymerization method in which a reactive monomer or a polymer having reactivity is attached to the substrate surface and thereafter reaction is caused by radiation or by plasma or ultraviolet irradiation; etc. Especially, a method for treating the substrate surface with corona or plasma under an atmosphere from vacuum to atmospheric pressure is preferable.

Examples of the method for treating the substrate surface with corona or plasma include a method for carrying out surface treatment for a substrate including setting the substrate between mutually opposed electrodes and generating corona or plasma under near atmospheric pressure; a method including introducing a gas between mutually opposed electrodes, generating plasma from the gas between the electrodes, and blowing the gas in plasma state to a substrate; and a method for carrying out surface treatment for a substrate including generating glow discharge plasma in a low pressure condition.

Among them, preferred is a method for carrying out surface treatment for a substrate including setting the substrate between mutually opposed electrodes and generating corona or plasma under near atmospheric pressure or a method including introducing a gas between mutually opposed electrodes, generating plasma from the gas between the electrodes, and blowing the gas in plasma state to a substrate. The surface treatment by corona or plasma is usually carried out using a commercially available surface treatment device.

The substrate may have a protection film on a surface opposite to the surface on which the optically absorptive anisotropic composition is coated. Examples of the protection film include films of polyethylene, polyethylene terephthalate, polycarbonate and polyolefin, as well as the above films further having a pressure-sensitive adhesive layer, etc. Among them, polyethylene terephthalate is preferable because of slight thermal deformation at the time of being dried When the protection film is formed on a surface opposite to the surface on which the optically absorptive anisotropic composition is coated, swinging of the film and weak vibration of the coated surface at the time of transportation of the substrate can be suppressed, and the evenness of the coating layer can be improved.

The thickness of the substrate is more preferable to be thinner in terms of weight adequate for practical handling, but if the thickness is too thin, the strength is lowered and processability tends to become inferior. The thickness of the substrate is usually 5 to 300 μm, and preferably 20 to 200 μm.

The length of the substrate in the longitudinal direction is usually 10 to 3000 m, and preferably 100 to 2000 m. The length of the substrate in the shorter direction is usually 0.1 to 5 and preferably 0.2 to 2 m.

<Liquid Crystalline Compound>

The optically absorptive anisotropic film is a liquid crystal cured film containing a dichroic dye and a liquid crystalline compound.

As the liquid crystalline compound incorporated in the present optically absorptive anisotropic film, polymerizable liquid crystals are preferable.

The polymerizable liquid crystals are compounds having a polymerizable group and liquid crystalline properties.

The polymerizable group means a group involved in polymerization reaction, and is preferably a photopolymerizable group. Herein, the photopolymerizable group is a group which can be involved in polymerization reaction with an active radical or an acid generated from a photopolymerization initiator described later. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, an oxetanyl group, etc. Among them, an acryloyloxy group, a methacryloyloxy group, a vinyloxy group, an oxiranyl group and an oxetanyl group are preferable, and an acryloyloxy group is more preferable. The liquid crystalline compound may be a thermotropic liquid crystal or a lyotropic liquid crystal, and a phase order structure in the thermotropic liquid crystal may be a nematic liquid crystal or a smectic liquid crystal. Preferred is the compound to form the smectic liquid crystal phase, more preferred the compound forming the high order smectic liquid crystal phase, such as the smectic B phase. When the liquid crystal phase formed from the liquid crystalline compound is the high order smectic liquid crystal phase, the optically absorptive anisotropic film having a higher degree of orientation order can be produced, and the values of Ax (Z=60)/Ax and Ay (Z=60)/Ay tend to be higher by making the degree of orientation order higher.

As the polymerizable liquid crystals, smectic liquid crystals are preferable, and higher order smectic liquid crystals are more preferable in that higher polarizing performance is obtained. Among them, more preferred are higher order smectic liquid crystals forming a smectic B phase, a smectic D phase, a smectic E phase, a smectic F phase, a smectic G phase, a smectic H phase, a smectic I phase, a smectic J phase, a smectic K phase or a smectic L phase, and further more preferred are higher order smectic liquid crystals forming a smectic B phase, a smectic F phase or a smectic I phase. When the liquid crystal phases formed by the polymerizable liquid crystals are these higher order smectic phases, a liquid crystal cured film having a higher degree of orientation order can be produced, and high polarizing performance is obtained. In the liquid crystal cured film having a higher degree of orientation order, a Bragg peak derived from a higher order structure such as a hexatic phase or a crystal phase is obtained in X-ray diffraction measurement. The Bragg peak is a peak derived from a periodic structure of molecular orientation, and a film having its periodic interval of 3.0 to 6.0 angstroms can be obtained. Examples of the smectic liquid crystals include specifically compounds represented by the following formula (1) (hereinafter, may be referred to as compound (1)), etc. The polymerizable liquid crystals may be used alone or may be used in combination.

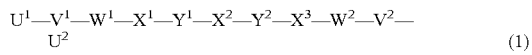 (1)

in the formula (1), $X^1$, $X^2$ and $X^3$ each independently represent an optionally substituted 1,4-phenylene group or an optionally substituted cyclohexane-1,4-diyl group, provided that at least one of $X^1$, $X^2$ and $X^3$ is an optionally substituted 1,4-phenylene group; the group (—$CH_2$—) constituting the cyclohexane-1,4-diyl group may be substituted with —O—, —S— or —NR—; R represents an alkyl group or phenyl group with a carbon number of 1 to 6;

$Y^1$ and $Y^2$ each independently represent —$CH_2CH_2$—, —$CH_2O$—, —COO—, —OCOO—, a single bond, —N=N—, —$CR^a$=$CR^b$—, —C≡C— or —$CR^a$=N—; $R^a$ and $R^b$ each independently represent a hydrogen atom or an alkyl group with a carbon number of 1 to 4;

$U^1$ represents a hydrogen atom or a polymerizable group;

$U^2$ represents a polymerizable group;

$W^1$ and $W^2$ each independently represent a single bond, —O—, —S—, —COO—, or —OCOO—;

$V^1$ and $V^2$ each independently represent an optionally substituted alkanediyl group with a carbon number of 1 to 20 where —$CH_2$— constituting the alkanediyl group may be substituted with —O—, —S— or —NH—.

In the compound (1), at least one of $X^1$, $X^2$ and $X^3$ is preferably an optionally substituted 1,4-phenylene group.

The optionally substituted 1,4-phenylene group is preferably unsubstituted. The optionally substituted cyclohexane-1,4-diyl group is preferably an optionally substituted trans-cyclohexane-1,4-diyl group; and the optionally substituted trans-cyclohexane-1,4-diyl group is preferably unsubstituted.

Examples of the substituent arbitrarily possessed by the optionally substituted 1,4-phenylene group or the optionally substituted cyclohexane-1,4-diyl group include alkyl groups with a carbon number of 1 to 4 such as a methyl group, an ethyl group and a butyl group; a cyano group; halogen atoms such as a chlorine atom and a fluorine atom; etc.

$Y^1$ is preferably —$CH_2CH_2$—, —COO— or a single bond, and $Y^2$ preferably —$CH_2CH_2$— or —$CH_2O$—.

$U^2$ is a polymerizable group. $U^1$ is a hydrogen atom or a polymerizable group and preferably a polymerizable group. $U^1$ and $U^2$ are both preferably a polymerizable group, and more preferably a photopolymerizable group. A polymerizable liquid crystal compound having a photopolymerizable group is advantageous in terms of being capable of polymerization under lower temperature conditions.

The polymerizable groups represented by $U^1$ and $U^2$ may be different from each other, but are preferably the same. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, an oxetanyl group, etc. Among them, an acryloyloxy group, a methacryloyloxy group, a vinyloxy group, an oxiranyl group and an oxetanyl group are preferable, and an acryloyloxy group is more preferable.

Examples of the alkanediyl group represented by $V^1$ and $V^2$ include a methylene group, an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,8-diyl group, a decane-1,10-diyl group, a tetradecane-1,14-diyl group, an icosane-1,20-diyl group, etc. $V^1$ and $V^2$ are preferably an alkanediyl group with a carbon number of 2 to 12, more preferably an alkanediyl group with a carbon number of 6 to 12.

Examples of the substituent arbitrarily possessed by the optionally substituted alkanediyl group with a carbon number of 1 to 20 include a cyano group, halogen atoms such as a chlorine atom and a fluorine atom, etc. The alkanediyl group is preferably unsubstituted, more preferably unsubstituted and linear.

Preferably, $W^1$ and $W^2$ are each independently a single bond or —O—.

Specific examples of the compound (1) include compounds represented by the formula (1-1) to the formula (1-23). When the compound (1) has a cyclohexane-1,4-diyl group, the cyclohexane-1,4-diyl group is preferably a trans type.

(1-1)
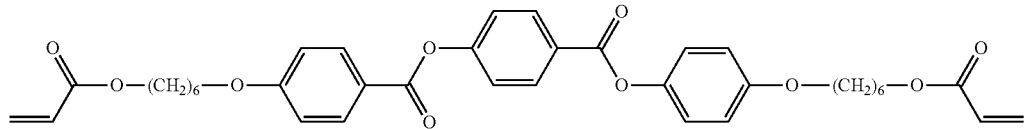
(1-2)
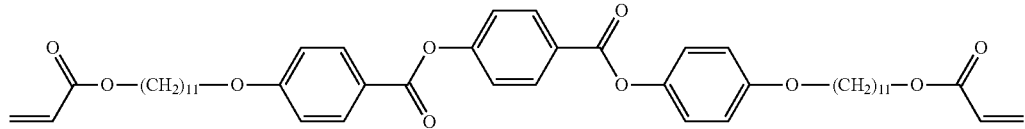
(1-3)
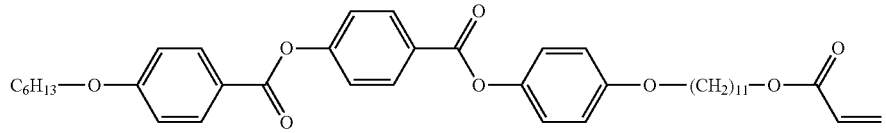
(1-4)
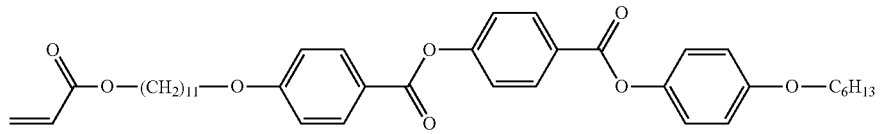
(1-5)
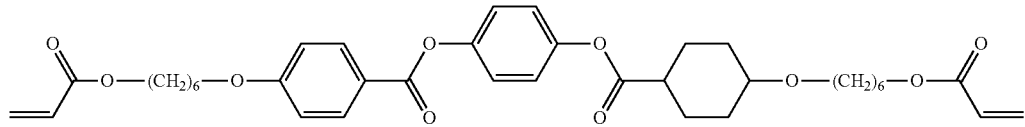
(1-6)
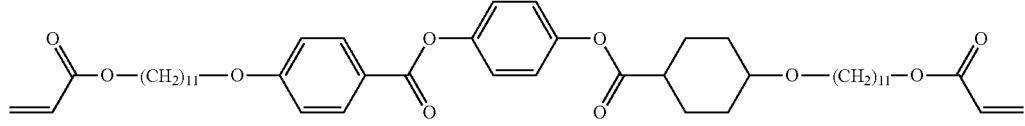
(1-7)
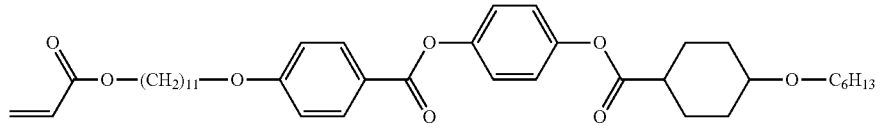
(1-8)
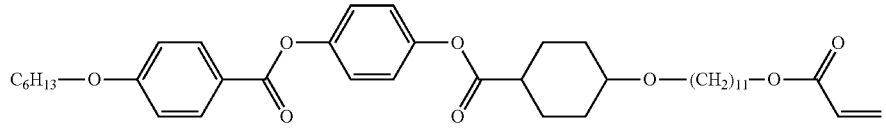
(1-9)
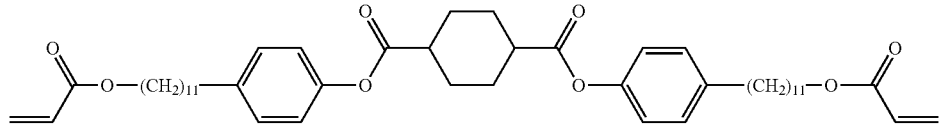
(1-10)
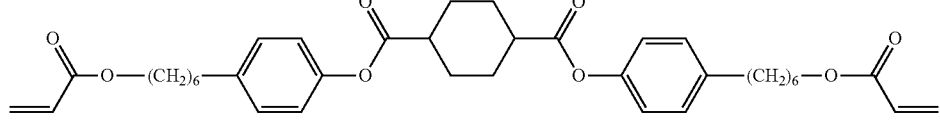
(1-11)
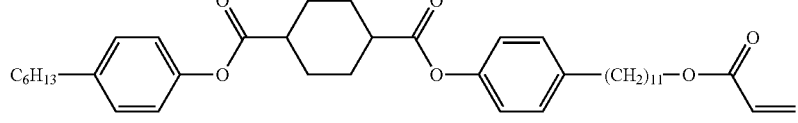

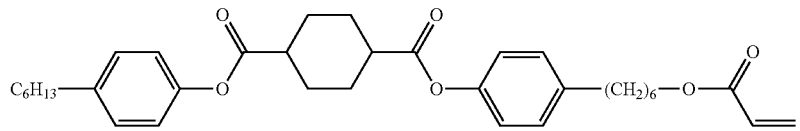
(1-12)
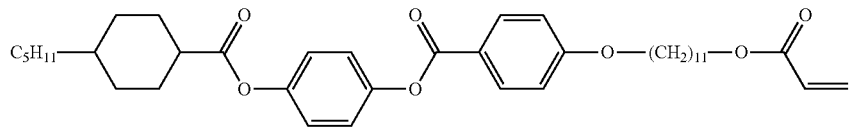
(1-13)
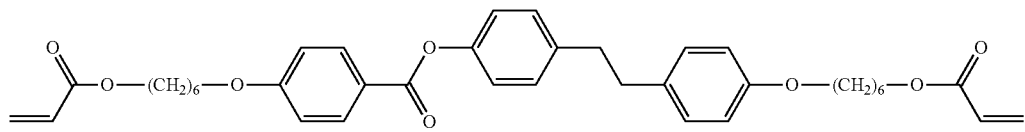
(1-14)
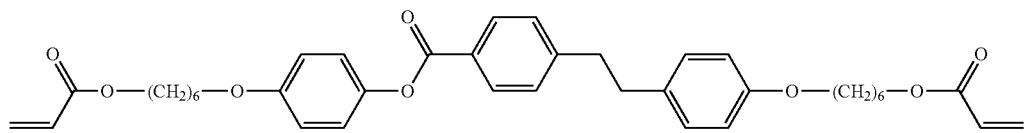
(1-15)
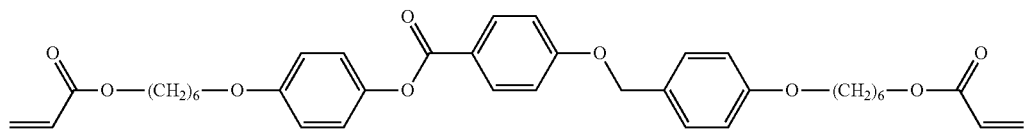
(1-16)
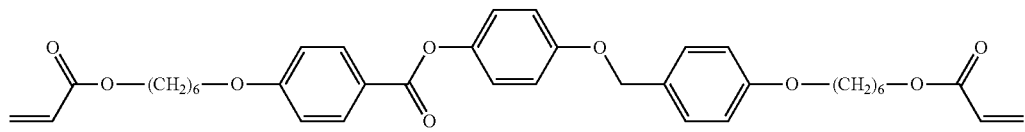
(1-17)
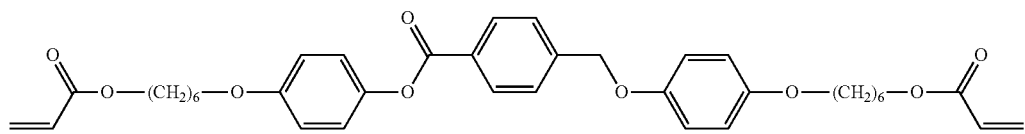
(1-18)
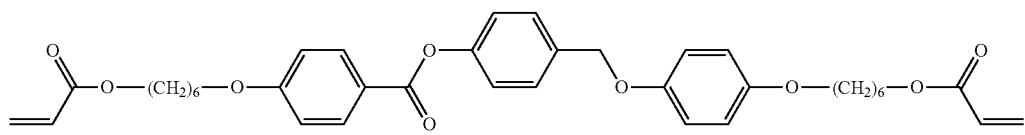
(1-19)
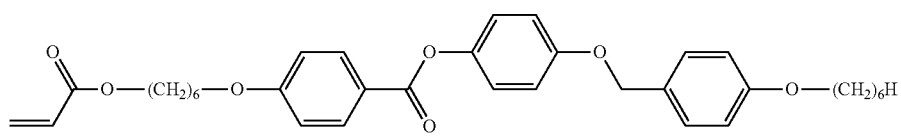
(1-20)
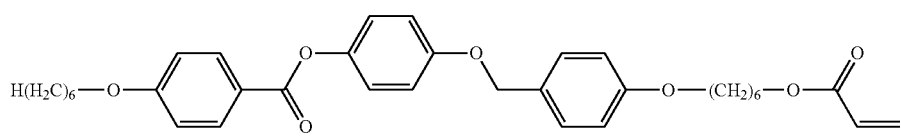
(1-21)
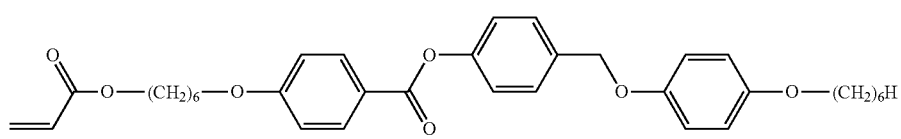
(1-22)

(1-23)

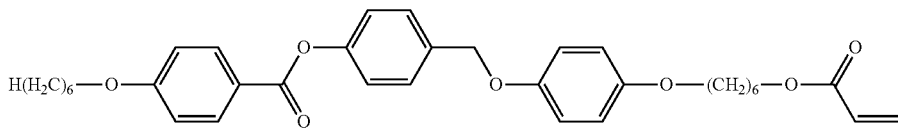

Among the compounds (1) listed above, at least one kind selected from the group consisting of compounds represented by the formula (1-2), the formula (1-3), the formula (1-4), the formula (1-6), the formula (1-7), the formula (1-8), the formula (1-13), the formula (1-14) and the formula (1-15) is preferable.

The compounds (1) listed above may be used alone or may be used in combination for the liquid crystal cured film. When two or more kinds of the polymerizable liquid crystals are used in combination, it is preferable that at least one kind is the compound (1), and it is more preferable that two or more kinds are the compound (1). Combination use may sometimes retain a liquid crystal phase temporarily even at a liquid crystal-crystal phase transition temperature or lower. When two kinds of the polymerizable liquid crystals are used in combination, the mixing ratio is usually 1:99 to 50:50, preferably 5:95 to 50:50, and more preferably 10:90 to 50:50. When two kinds of the polymerizable liquid crystals are used in combination and only one kind is the compound (1), it is preferable that the compound (1) is blended so that the mixing ratio of the compound (1) becomes a high ratio.

The polymerizable liquid crystals are produced by the conventionally known methods described in, for example, Lub et al. Reel. Trav. Chim. Pays-Bas, 115, 321-328 (1996) and Japanese Patent No. 4719156.

The content of the liquid crystals in the optically absorptive anisotropic film is usually 70 to 99.5 parts by mass, preferably 80 to 99 parts by mass, more preferably 80 to 94 parts by mass, further preferably 80 to 90 parts by mass based on 100 by mass of the optically absorptive anisotropic film in terms of improvement in orientation of the liquid crystals. The content of the liquid crystals in the optically absorptive anisotropic film can be calculated as a proportion of the liquid crystals based on 100 parts by mass of the solid content of the optically absorptive anisotropic composition forming the optically absorptive anisotropic film.

<Polymerization Initiator>

The present optically absorptive anisotropic composition may contain a polymerization initiator.

The polymerization initiator is a compound which can initiate the polymerization reaction of the polymerizable liquid crystals or the like. A photopolymerization initiator generating an active radical by light action is preferable as the polymerization initiator.

Examples of the polymerization initiator may include a benzoin compound, a benzophenone compound, an alkylphenone compound, an acylphosphine oxide compound, a triazine compound, an iodonium salt, a sulfonium salt, etc.

Examples of the benzoin compound may include benzoin, benzoin methyl ether, benzoin ethyl ether, benzoin isopropyl ether, benzoin isobutyl ether, etc.

Examples of the benzophenone compound may include benzophenone, methylo-benzoylbenzoate, 4-phenylbenzophenone, 4-benzoyl-4'-methyldiphenyl sulfide, 3,3',4,4'-tetra(tert-butyl peroxycarbonyl)benzophenone, 2,4,6-trimethylbenzophenone, etc.

Examples of the alkylphenone compound may include diethoxy acetophenone, 2-methyl-2-morpholino-1-(4-methyl thiophenyl)propan-1-one, 2-benzyl-2-dimethylamino-1-(4-morpholinophenyl)butan-1-one, 2-hydroxy-2-methyl-1-phenylpropan-1-one, 1,2-diphenyl-2,2-dimethoxyethan-1-one, 2-hydroxy-2-methyl-1-[4-(2-hydroxyethoxy)phenyl]propan-1-on e, 1-hydroxycyclohexyl phenyl ketone, an oligomer of 2-hydroxy-2-methyl-1-[4-(1-methylvinyl)phenyl]propan-1-one, etc.

Examples of the acylphosphine oxide compound may include 2,4,6-trimethylbenzoyldiphenylphosphine oxide, bis(2,4,6-trimethylbenzoyl)phenylphosphine oxide, etc.

Examples of the triazine compound may include
2,4-bis(trichloromethyl)-6-(4-methoxyphenyl)-1,3,5-triazine,
2,4-bis(trichloromethyl)-6-(4-methoxynaphthyl)-1,3,5-triazine,
2,4-bis(trichloromethyl)-6-(4-methoxystyryl)-1,3,5-triazine,
2,4-bis(trichloromethyl)-6-[2-(5-methylfuran-2-yl)ethenyl]-1,3,5-triazine,
2,4-bis(trichloromethyl)-6-[2-(furan-2-yl)ethenyl]-1,3,5-triazine,
2,4-bis(trichloromethyl)-6-[2-(4-diethylamino-2-methylpheny 1)ethenyl]-1,3,5-triazine,
2,4-bis(trichloromethyl)-6-[2-(3,4-dimethoxyphenyl)ethenyl]-1,3,5-triazine, etc.

As the polymerization initiator, a commercially available polymerization initiator can be used. Examples of the commercially available polymerization initiator include Irgacure (registered trademark) 907, 184, 651, 819, 250 and 369 (BASF); SEIKUOL (registered trademark) BZ, Z and BEE (Seiko Chemical Co., Ltd.); Kayacure (registered trademark) BP100 and UVI-6992 (Nippon Kayaku Co., Ltd.); Adeka Optomer SP-152 and SP-170 (ADEKA); TAZ-A and TAZ-PP (DKSH Japan); TAZ-104 (Sanwa Chemical Co., Ltd.); etc.

The content of the polymerization initiator is usually 0.1 to 30 parts by mass, preferably 0.5 to 10 parts by mass, more preferably 0.5 to 8 parts by mass based on 100 parts by mass of the polymerizable liquid crystals in terms of hardly causing orientation disorder of the polymerizable liquid crystals.

<Leveling Agent>

The present optically absorptive anisotropic film may contain a leveling agent.

The leveling agent has a function of adjusting the fluidity of the optically absorptive anisotropic composition and leveling the optically absorptive anisotropic film in a higher manner, and examples thereof include a surfactant. Preferable examples of the leveling agent include a leveling agent containing a polyacrylate compound as a main component and a leveling agent containing a fluorine atom-containing compound as a main component.

Examples of the leveling agent containing a polyacrylate compound as a main component may be BYK-350, BYK-352, BYK-353, BYK-354, BYK-355, BYK-358N, BYK-361N, BYK-380, BYK-381 and BYK-392 (BYK Chemie), etc.

Examples of the leveling agent containing a fluorine atom-containing compound as a main component include Megafac (registered trademark) R-08, R-30, R-90, F-410, F-411, F-443, F-445, F-470, F-471, F-477, F-479, F-482, F-483

(DIC Corporation); Surflon (registered trademark) S-381, S-382, S-383, S-393, SC-101, SC-105, KH-40 and SA-100 (AGC Seimi Chemical CO., Ltd.); E1830 and E5844 (Daikin Industries, Ltd.); FTOP EF301, EF303, EF351 and EF352 (Mitsubishi Materials Electronic Chemicals Co., Ltd.); etc.

The content of the leveling agent in the optically absorptive anisotropic film is usually 0.01 parts by mass or more and 5 parts by mass or less, preferably 0.1 parts by mass or more and 3 parts by mass or less based on 100 parts by mass of the liquid crystals.

If the content of the leveling agent falls within the above range, the resulting liquid crystal cured film favorably tends to be more smooth. If the content of the leveling agent to the liquid crystals exceeds the above range, the resulting liquid crystal cured film unfavorably tends to have unevenness, or the film unfavorably tends to be oriented in a horizontal direction. The optically absorptive anisotropic film may contain two or more kinds of the leveling agents.

<Solvent>

The present optically absorptive anisotropic composition used for the formation of the present optically absorptive anisotropic film may contain a solvent.

As the solvent, when the liquid crystalline compound is contained, a solvent which can completely dissolve the liquid crystals is preferable, and when the liquid crystals are polymerizable liquid crystals, the solvent is preferably inert to the polymerization reaction.

Examples of the solvent include alcohol solvents such as methanol, ethanol, ethylene glycol, isopropyl alcohol, propylene glycol, ethylene glycol methyl ether, ethylene glycol butyl ether and propylene glycolmonomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, 2-heptanone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; chlorine-containing solvents such as chloroform and chlorobenzene; etc. These solvents may be used alone, or may be used in combination.

The content of the solvent is preferably 50 to 98% by mass based on the total mass of the optically absorptive anisotropic composition. In other words, the proportion of the optically absorptive anisotropic film component is preferably 2 to 50% by mass based on the total mass of the optically absorptive anisotropic composition.

If the solid content is 50% by mass or less based on the total mass of the optically absorptive anisotropic composition, the viscosity of the optically absorptive anisotropic composition is lowered so that the thickness of the liquid crystal cured film is substantially uniform. Accordingly, the liquid crystal cured film hardly tends to have unevenness. The solid matter may be determined in consideration of the thickness of the liquid crystal cured film to be produced.

<Orientation Film>

The present optical film comprising the optically absorptive anisotropic film and a substrate may contain an orientation film between the substrate and the optically absorptive anisotropic film.

The orientation film in the present invention has an orientation regulation force for orientating the dichroic dye and the liquid crystals in a direction vertical to the substrate.

The orientation film is preferably a film having solvent resistance such that the film is not dissolved by coating of the optically absorptive anisotropic composition, etc., and having heat resistance in heat treatment for solvent removal or orientation of the liquid crystals. Examples of the orientation film include an orientation film including an orienting polymer, a photo-orientation film, etc.

<Orientation Film Including Orienting Polymer>

Examples of the orienting polymer include polyamides and gelatins having an amide bond in a molecule; polyimides having an imide bond in a molecule and their hydrolyzed products, polyamic acids; polyvinyl alcohols; alkyl group-modified polyvinyl alcohols; polyacrylamides; polyoxazoles; polyethyleneimines; polystyrenes; polyvinylpyrrolidones; polyacrylic acids; and polyacrylic acid esters. Among them, polyvinyl alcohols are preferable. Two or more kinds of the orienting polymers may be used in combination.

The orientation film including the orienting polymer is usually formed on a surface of a substrate by coating the substrate with a composition in which the orienting polymer is dissolved in a solvent (hereinafter, may be referred to as orienting polymer composition) and removing the solvent, or coating the substrate with the orienting polymer composition and removing the solvent, followed by rubbing (rubbing method).

Examples of the solvent include water; alcohol solvents such as methanol, ethanol, ethylene glycol, isopropyl alcohol, propylene glycol, methyl cellosolve, butyl cellosolve and propylene glycol monomethyl ether; ester solvents such as ethyl acetate, butyl acetate, ethylene glycol methyl ether acetate, γ-butyrolactone, propylene glycol methyl ether acetate and ethyl lactate; ketone solvents such as acetone, methyl ethyl ketone, cyclopentanone, cyclohexanone, methyl amyl ketone and methyl isobutyl ketone; aliphatic hydrocarbon solvents such as pentane, hexane and heptane; aromatic hydrocarbon solvents such as toluene and xylene; nitrile solvents such as acetonitrile; ether solvents such as tetrahydrofuran and dimethoxyethane; and chlorinated-hydrocarbon solvents such as chloroform and chlorobenzene. These solvents may be used alone or two or more kinds thereof may be used in combination.

The concentration of the orienting polymer in the orienting polymer composition may fall within a range of completely dissolving the orienting polymer material in a solvent, and the concentration to the solvent is preferably 0.1 to 20% and more preferably around 0.1 to 10% in terms of solid matter.

A commercially available orientation film material may be used as it is as the orienting polymer composition. Examples of the commercially available orientation film material include Sunever (registered trademark, manufactured by Nissan Chemical Industries, Ltd.), Optomer (registered trademark, manufactured by JSR Corporation), etc.

Examples of a method for coating the substrate with the orienting polymer composition include known methods such as coating methods including a spin coating method, an extrusion method, a gravure coating method, a die coating method, a slit coating method, a bar coating method, an applicator method, etc.; and printing methods including a flexographic method. When the present optical film is produced by a continuous production method in a Roll to Roll manner described later, the coating method is usually conducted by a gravure coating method, a die coating method or a printing method such as a flexographic method.

Examples of a method for removing the solvent contained in the orienting polymer composition include a natural drying method, a blow drying method, a heat drying method, a vacuum drying method, etc.

In order to provide the orientation film with orientation regulation force, rubbing is carried out if necessary (rubbing method). The direction of the orientation regulation force can be controlled arbitrarily by selecting the direction for rubbing.

Examples of a method for providing the orientation regulation force by rubbing method include a method for bringing a film of the orienting polymer, which is formed on a substrate surface by coating the substrate with the orienting polymer composition and annealing the orienting polymer composition, into contact with a rotating rubbing roll on which a rubbing cloth is wound.

<Photo-Orientation Film>

A photo-orientation film is usually formed on a surface of a substrate by coating the substrate with a composition containing a photo-reactive group-containing polymer or monomer and a solvent (hereinafter, may be referred to as "composition for forming a photo-orientation film"), and irradiating the composition with light (preferably, polarized UV). The photo-orientation film is more preferable in that the direction of the orientation regulation force can be arbitrarily controlled by selecting the polarization direction of light to be irradiated.

A photo-reactive group refers to a group which generates liquid crystal orienting ability by light irradiation. Specifically, examples of the photo-reactive group include groups involved in orientation induction of molecules generated by light irradiation or in photo-reaction such as isomerization reaction, dimerization reaction, photo-crosslinking reaction, or photo-degradation reaction which originates the liquid crystal orienting ability. Among them, photo-reactive groups involved in dimerization reaction or photo-crosslinking reaction are preferable because they are excellent in orientation. The photo-reactive group preferably has an unsaturated bond, particularly a double bond, and particularly preferably at least one bond selected from the group consisting of a carbon-carbon double bond (C=C bond), a carbon-nitrogen double bond (C=N bond), a nitrogen-nitrogen double bond (N=N bond) and a carbon-oxygen double bond (C=O bond).

Examples of the photo-reactive group having a C=C bond may be a vinyl group, a polyene group, a stilbene group, a stilbazole group, a stilbazolium group, a chalcone group and a cinnamoyl group. Examples of the photo-reactive group having a C=N bond may be groups having a structure of an aromatic Schiff base, an aromatic hydrazone, etc. Examples of the photo-reactive group having a N=N bond may be an azobenzene group, an azonaphthalene group, an aromatic heterocyclic azo group, a bisazo group, a formazan group and a group having a structure of azoxybenzene. Examples of the photo-reactive group having a C=O bond may be a benzophenone group, a coumarin group, an anthraquinone group and a maleimide group. These groups may have a substituent group such as alkyl group, alkoxy group, aryl group, allyloxy group, cyano group, alkoxycarbonyl group, hydroxyl group, sulfonic acid group or halogenated alkyl group.

Among them, a photo-reactive group involved in photo-dimerization reaction is preferable, and a cinnamonyl group and a chalcone group are preferable in that the polarized light irradiation dose necessary for photo-orientation is relatively low and a photo-orientation film excellent in heat stability and stability with lapse of time is easy to be obtained. A polymer having a photo-reactive group is particularly preferably those having a cinnamonyl group which forms a cinnamic acid structure in a polymer side chain terminal.

Examples of the solvent contained in the composition for forming a photo-orientation film include those which are the same as solvents contained in the foregoing orienting polymer composition, and the solvent may be selected properly depending on the solubility of the photo-reactive group-containing polymer or monomer.

The content of the photo-reactive group-containing polymer or monomer in the composition for forming a photo-orientation film can be appropriately adjusted depending on the kind of the polymer or monomer and the thickness of an objective photo-orientation film; however, it is preferably at least 0.2% by mass and more preferably in a range of 0.3 to 10% by mass. The composition for forming a photo-orientation film may contain a polymer material such as polyvinyl alcohol or polyimide and a photosensitizer to an extent that the characteristics of the photo-orientation film are not significantly deteriorated.

Examples of a method for coating the substrate with the composition for forming a photo-orientation film include the same method as the method for coating the substrate with the orienting polymer composition. Examples of a method for removing the solvent from the coated composition for forming a photo-orientation film include the same method as the method for removing the solvent from the orienting polymer composition.

The manner of polarized light irradiation may be a manner of directly irradiating the composition for forming a photo-orientation film, from which the solvent has been removed, coated on a substrate with polarized UV, or a manner of irradiating a substrate with polarized light and thereby transmitting the polarized light. In particular, the polarized light is preferably substantially parallel light. The wavelength of the polarized light for irradiation preferably falls within a wavelength range in which the photo-reactive group of the photo-reactive group-containing polymer or monomer easily absorbs light energy. Specifically, UV (ultraviolet rays) falling within a wavelength range of 250 to 400 nm is particularly preferable. A light source to be used for polarized light irradiation may be a xenon lamp, a high pressure mercury lamp, a super-high pressure mercury lamp, a metal halide lamp, ultraviolet laser of KrF or ArF, etc. and a high pressure mercury lamp, a super-high pressure mercury lamp and a metal halide lamp are more preferable. These lamps are preferable since having high emission intensity of ultraviolet rays with a wavelength of 313 nm. Light from the light source may be radiated through a proper polarizer to carry out polarized UV irradiation. Usable polarizers are a polarizing filter, polarizing prisms of Glan-Thomson and Glan-Taylor, and a wire-grid type polarizer.

I When rubbing or polarized light irradiation is carried out with masking, a plurality of regions (patterns) having different liquid crystal orientations can be also formed.

The thickness of the orientation film is usually 10 nm to 10000 nm, preferably 10 nm to 1000 nm, more preferably 10 to 500 nm.

<Method for Producing the Present Optically Absorptive Anisotropic Film and the Present Optical Film>

The optically absorptive anisotropic film of the present invention is a film in which the absorption axis of the dichroic dye is made to orient the direction orthogonal to the film plane. In the optically absorptive anisotropic film of host-guest type, such as the optically absorptive anisotropic film of present invention, the direction of the absorption axis of a dichroic dye is usually controlled by a orienting direction of a liquid crystal compound. Usually, the direction of the absorption axis of the dichroic dye can be oriented to the direction orthogonal to the film plane by making the orienting direction of the long axis of the liquid crystal compound orthogonal to the film plane. The orienting direction of the liquid crystal compound is controlled by properties of the substrate applied with the composition comprising the liquid crystal, the dichroic dye and a solvent, by properties of the orientation film, or by properties of the liquid crystal compound. Thus, the optically absorptive anisotropic film of present invention can be obtained by using the substrate or the orientation film which has respectively an orientation regulation force for orienting in the direction orthogonal to the film plane or by using the liquid crystal compound which tends to orient easily in the direction orthogonal to the film plane. The liquid crystal compound exhibiting a smectic liquid crystal phase orients easily in the direction orthogonal to the film plane. The optically absorptive anisotropic film obtained by orienting the direction of the absorption axis of the dichroic dye to the direction orthogonal to the film plane, satisfies the formula (1) mentioned above.

The present optical film can be produced by performed the following steps of (1), (2), (3) and (4) in this order. After the optical film is laminated to an adherend via an adhesive, the optically absorptive anisotropic film of the present invention can be obtained by removing the substrate from the optical film.

(1) a step of forming a coating layer by coating a substrate with a composition comprising the liquid crystalline compound, the dichroic dye and a solvent;

(2) a step of forming a dried layer by removing the solvent from the coating layer;

(3) a step of developing a liquid crystal phase by cooling the dried layer; and (4) a step of curing the liquid crystalline compound by applying active energy rays.

<Step (1)>

Examples of a method for coating the substrate with the composition containing a liquid crystal compound, a dichroic dye and a solvent (optically absorptive anisotropic composition) include the same method as that described as the method for coating the substrate with the orientation polymer composition.

<Step (2)>

When the optically absorptive anisotropic composition contains a solvent, usually, the solvent is removed from the coated optically absorptive anisotropic composition. Examples of a method for removing the solvent include a natural drying method, a blow drying method, a heat drying method, a vacuum drying method, etc. The dried layer is preferably dried until the remaining solvent in the optically absorptive anisotropic film becoming of 1% by weight or less relative to the total weight of the optically absorptive anisotropic film. The amount of the remaining solvent can be quantitatively determined by peeling the optically absorptive anisotropic film from the substrate to weigh the film, immersing the resulting optically absorptive anisotropic film in a solvent such as tetrahydrofuran which dissolves the optically absorptive anisotropic film, irradiating the resulting solution with ultrasound for 10 minutes to extract dissolved components, and thereafter, analyzing this solution by gas chromatography.

<Step (3)>

The coated liquid crystals are usually heated to a temperature or higher temperature for transition to a liquid crystal state or a solution state, and then cooled to a temperature for liquid crystal orientation to form an oriented liquid crystal phase.

The temperature for orienting the coated liquid crystals may be determined by previously observing the texture using a composition containing the liquid crystals. The solvent removal and the liquid crystal orientation may be carried out simultaneously. The temperature at that time is preferably in a range of 50 to 200° C. although depending on the kind of the solvent to be removed and the kind of the liquid crystals to be contained, and more preferably in a range of 80 to 130° C. when the substrate is a resin substrate.

<Step (4)>

The liquid crystals are polymerized by irradiating the oriented liquid crystals with active energy rays.

The polymerized liquid crystals form an optically absorptive anisotropic film. A liquid crystal cured film containing the polymerizable liquid crystals polymerized with retaining a smectic liquid crystal phase has higher polarizing performance as compared with a conventional host-guest type polarizing film which means a polarizing film obtained by polymerizing polymerizable liquid crystals or the like with retaining a nematic liquid crystal phase, and is also excellent in polarizing performance and strength as compared with a polarizing film obtained by coating with only a dichroic dye or a lyotropic liquid crystal.

A light source for the active energy rays may be those which can emit ultraviolet rays, electron beam, x-ray, etc., and preferably a light source such as low pressure mercury lamp, medium pressure mercury lamp, high pressure mercury lamp, super-high pressure mercury lamp, chemical lamp, black light lamp or microwave excitation mercury lamp, which has light emission distribution in a wavelength of 400 nm or less.

The active energy rays are more preferably ultraviolet rays parallel with the normal direction of the substrate.

The irradiation energy of the active energy rays is set in such a way that a wavelength region effective to activate a polymerization initiator preferably has a radiation intensity of 10 to 5000 mJ/cm$^2$, and more preferably 100 to 2000 mJ/cm$^2$. If the irradiation energy is lower than 10 mJ/cm$^2$, curing of the liquid crystals tends to be insufficient.

<Continuous Production Method for the Present Optical Film>

Figure 2:
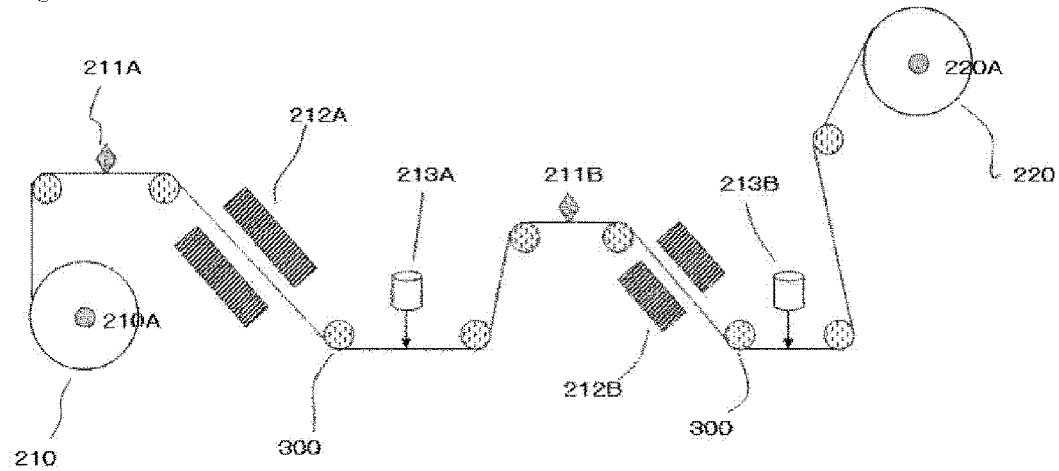
FIG. 2 is a schematic view of a method for producing an optically absorptive anisotropic film.

The present optical film is continuously produced in a Roll to Roll manner. One example of a main part of a continuous production method in a Roll to Roll manner will be described with reference to FIG. 2. In the following description, a production method when an orientation film is included between a substrate and an optically absorptive anisotropic film will be shown, but it goes without saying that the present optically absorptive anisotropic film may not include an orientation film. Also in the following description, a production method when polymerizable liquid crystals are used as the liquid crystals will be shown, but the method is not limited thereto.

A first roll 210 having a first roll core 210A rewinding a substrate is easily available, for example, from the market. Examples of the substrate in the form of a roll and available from the market include, among the substrates listed above, films made of cellulose ester, cyclic olefin-based resin, polycarbonate, polyethylene terephthalate and polymethacrylic acid ester, etc.

Successively, the substrate is wound off from the first roll 210. A method for winding off the substrate is carried out by installing proper rotating means in the roll core 210A of the first roll 210 and rotating the first roll 210 by the rotating means. The method may be also carried out by installing a proper auxiliary roll 300 in the substrate transportation direction from the first roll 210 and winding off the substrate by rotating means of the auxiliary roll 300. Further, the method may be also carried out by installing rotating means in both of the first roll core 21OA and the auxiliary roll 300 and winding off the substrate while applying proper tensile force to the substrate.

When passes through a coating device 211A, the substrate wound off from the first roll 210 is coated, on its surface, with a composition for forming a photo-orientation film by the coating device 211A. The coating device 211A for continuously coating the surface with the composition for forming a photo-orientation film in this manner is preferably a device for a gravure coating method, a die coating method and a flexographic method.

The substrate passed through the coating device 211A is transported to a drying furnace 212A and dried in the drying furnace 212A so that a first coating layer is continuously formed on the substrate surface. For example, a hot air blowing-type drying furnace in which a blowing drying method and a heat drying method are combined may be used for the drying furnace 212A. The temperature of the drying furnace 212A is set depending on the kind of the solvent contained in the composition for forming a photo-orientation film, etc. The drying furnace 212A may be composed of a plurality of zones each having different temperature or a plurality of drying furnaces each having different temperature and arranged in series.

The resulting first coating layer is irradiated with polarized light by a polarized UV irradiation device 213A to obtain a photo-orientation film.

Successively, the substrate on which the photo-orientation film is formed passes through a coating device 211B. After the photo-orientation film is coated with a composition containing a dichroic dye, polymerizable liquid crystals and a solvent by the coating device 211B, the substrate passes through a drying furnace 212B so that a second coating film is formed in which the polymerizable liquid crystals are oriented. The drying furnace 212B plays a role for removing the solvent from the composition containing the polymerizable liquid crystals and the solvent coated on the photo-orientation film, and also a role for providing heat energy so that the polymerizable liquid crystals contained in the composition are oriented. Similarly to the drying furnace 212A, the drying furnace 212B may be composed of a plurality of zones each having different temperature or a plurality of drying furnaces each having different temperature and arranged in series.

The substrate is transported to an active energy ray irradiation device 213B in the state where the polymerizable liquid crystals contained in the second coating layer are oriented. In the active energy ray irradiation device 213B, active energy rays are irradiated. By active energy ray irradiation with the active energy ray irradiation device 213B, the polymerizable liquid crystals is cured in the state oriented.

Consequently, the optical film produced in a continuous manner is wound around a second roll core 220A to be in the form of a second roll 220. The winding together with a proper spacer may be carried out.

In this way, the present optical film can be continuously produced in a Roll to Roll manner by passing the substrate through the coating device 211A, the drying furnace 212A, the polarized UV irradiation device 213A, the coating device 211B, the drying furnace 212B, and the active energy ray irradiation device 213B in this order from the first roll 210.

When an orientation film has no orientation film between the substrate and the optically absorptive anisotropic film, the optical film can be produced by the similar production method such that the coating device 211A and the polarized UV irradiation device 213A are not included.

<Three-Dimensional Optically Absorptive Anisotropic Film>

A three-dimensional optically absorptive anisotropic film can be formed by laminating the present optically absorptive anisotropic film and a horizontal polarizing film. When the optical film and the horizontal polarizing film are laminated, the optical film is laminated in the side of the optically absorptive anisotropic film, and the substrate may be peeled.

When an absorption axis of the horizontal polarizing film is defined as an x'-axis, a transmission axis of the horizontal polarizing film is defined as a y'-axis and the axis orthogonal to the x'-axis and the y'-axis is defined as a z'-axis, the three-dimensional optically absorptive anisotropic film satisfies the formula (6).

$$Ax'>Az'>Ay' \tag{6}$$

In the formula (6), Ax', Ay' and Az' are an absorbances at a local maximum absorption wavelength of the dichroic dye contained in the optically absorptive anisotropic film. Ax' represents an absorbance of linearly polarized light vibrating in the direction of the x'-axis. Ay' represents an absorbance of linearly polarized light vibrating in the direction of the y'-axis. Az' represents an absorbance of linearly polarized light vibrating in the direction of the z'-axis. Ax' and Ay' can be measured by the same manner with Ax and Ay. Az' can be calculated by the formula (7). In the formula (7), Ay' represents an absorbance of linearly polarized light vibrating in the direction of the y'-axis in the state of the film rotated by 60° around the x'-axis.

$$Ay'(z=60)=Ay' \cos 60° + Az' \sin 60° \tag{7}$$

<Horizontal Polarizing Film>

A horizontal polarizing film has a polarizing function. Examples of the horizontal polarizing film include a stretched film on which a dye having absorption anisotropy is adsorbed, and a film coated with a dye having absorption anisotropy, etc. Examples of the dye having absorption anisotropy include dichroic dyes.

The stretched film on which the dye having absorption anisotropy is adsorbed is usually produced via a step of uniaxially stretching a polyvinyl alcohol-based resin film; a step of dyeing the polyvinyl alcohol-based resin film with a dichroic dye, to thereby adsorb the dichroic dye thereon; a step of treating, with an aqueous boric acid solution, the polyvinyl alcohol-based resin film on which the dichroic dye is adsorbed; and a step of washing the film with water after treatment with the aqueous boric acid solution.

The polyvinyl alcohol-based resin is obtained by saponifying a polyvinyl acetate-based resin. Examples of the polyvinyl acetate-based resin include polyvinyl acetate as a homopolymer of vinyl acetate and a copolymer of vinyl acetate and other monomers copolymerizable therewith. Examples of the other monomers copolymerizable with vinyl acetate include unsaturated carboxylic acids, olefins, vinyl ethers, unsaturated sulfonic acids, acryl amides having an ammonium group, etc.

The degree of saponification of the polyvinyl alcohol-based resin is usually 85 to 100 mol %, preferably 98 or more. The polyvinyl alcohol-based resin may be modified, and polyvinyl formal and polyvinyl acetal modified with aldehydes can be also used. The degree of polymerization of the polyvinyl alcohol-based resin usually falls within a range of 1,000 to 10,000, preferably 1,500 to 5,000.

Such a polyvinyl alcohol-based resin is formed into a film to obtain a raw film. The polyvinyl alcohol-based resin can be formed into a film by known method. The polyvinyl alcohol-based raw film preferably has a thickness of 10 to 150 μm.

The polyvinyl alcohol-based resin film can be uniaxially stretched before, simultaneously or after dyeing with the dichroic dye. When the film is uniaxially stretched after dyeing, the uniaxial stretching may be conducted before boric acid treatment, or may be conducted during boric acid treatment. The uniaxial stretching can be conducted at these plural stages. Upon uniaxial stretching, the film may be uniaxially stretched between rolls having different circumferential speeds, or may be uniaxially stretched using a heat roll. The uniaxial stretching may be dry stretching of conducting stretching in the atmospheric air, or may be wet stretching of conducting stretching in the state where the polyvinyl alcohol-based resin film is swelled using a solvent. The stretching ratio is usually 3 to 8 times.

The polyvinyl alcohol-based resin film is dyed with the dichroic dye by a method for immersing the polyvinyl alcohol-based resin film in an aqueous solution containing the dichroic dye.

Examples of the dichroic dye include iodine and a dichroic organic dye, preferable is iodine. Examples of the dichroic organic dye include a dichroic direct dye made of a disazo compound such as C.I. DIRECT RED 39 and a dichroic direct dye made of a compound such as trisazo or tetrakisazo. The polyvinyl alcohol-based resin film is preferably subjected to treatment of immersion in water before the dyeing treatment.

When the dichroic dye is iodine, a method for dyeing the polyvinyl alcohol-based resin film by immersing the film in an aqueous solution containing iodine and potassium iodide is usually adopted. The content of iodine in the aqueous solution is usually 0.01 to 1 part by mass per 100 parts by mass of water. The content of potassium iodide is usually 0.5 to 20 parts by mass per 100 parts by mass of water. The temperature of the aqueous solution used in the dyeing is usually 20 to 40° C. The time for immersion in this aqueous solution (dyeing time) is usually 20 to 1,800 seconds.

When the dichroic dye is a dichroic organic dye, a method for dyeing the polyvinyl alcohol-based resin film by immersing the film in an aqueous solution containing a water-soluble dichroic dye is usually adopted. The content of the dichroic organic dye in the aqueous solution is usually $1 \times 10^{-4}$ to 10 by mass, preferably $1 \times 10^{-3}$ to 1 part by mass, further preferably $1 \times 10^{-3}$ to $1 \times 10^{-2}$ parts by mass per 100 parts by mass of water. This aqueous solution may contain an inorganic salt such as sodium sulfate as a dyeing assistant. The temperature of the aqueous solution is usually 20 to 80° C. The time for immersion in this aqueous solution (dyeing time) is usually 10 to 1,800 seconds.

The boric acid treatment after dyeing with the dichroic dye can be usually conducted by a method for immersing the dyed polyvinyl alcohol-based resin film in an aqueous boric acid solution. The content of boric acid in the aqueous boric acid solution is usually 2 to 15 parts by mass, preferably 5 to 12 by mass per 100 parts by mass of water. When iodine is used as the dichroic dye, this aqueous boric acid solution preferably contains potassium iodide, and the content of potassium iodide is usually 0.1 to 15 parts by mass, preferably 5 to 12 parts by mass per 100 parts by mass of water. The time for immersion in the aqueous boric acid solution is usually 60 to 1,200 seconds, preferably 150 to 600 seconds, further preferably 200 to 400 seconds. The temperature for the boric acid treatment is usually 50° C. or higher, preferably 50 to 85° C., further preferably 60 to 80° C.

The polyvinyl alcohol-based resin film after the boric acid treatment is usually subjected to washing treatment with water. The washing treatment with water can be conducted by a method for immersing the boric acid-treated polyvinyl alcohol-based resin film in water. The temperature of water at the washing treatment is usually 5 to 40° C. The immersion time is usually 1 to 120 seconds.

After the washing treatment with water, drying treatment is conducted to obtain a horizontal polarizing film. The drying treatment can be conducted using a hot air dryer or an infrared ray heater. The temperature for the drying treatment is usually 30 to 100° C., preferably 50 to 80° C. The time for the drying treatment is usually 60 to 600 seconds, preferably 120 to 600 By the drying treatment, the moisture percentage of the horizontal polarizing film is reduced to around a practical degree. The moisture percentage is usually 5 to 20% by weight, preferably 8 to 15% by weight. If the moisture percentage is below 5% by weight, flexibility of the horizontal polarizing film may be lost, so that the horizontal polarizing film may be damaged or broken after the drying. If the moisture percentage is above 20% by weight, the heat stability of the horizontal polarizing film may be possibly deteriorated.

The thickness of the horizontal polarizing film thus obtained by subjecting the polyvinyl alcohol-based resin film to the uniaxial stretching, the dyeing with the dichroic dye, the boric acid treatment, the washing treatment with water and the drying is preferably 5 to 40 μm.

Examples of the film coated with the dye having absorption anisotropy include a film obtained by coating with a composition containing a dichroic dye having liquid crystalline properties or a composition containing a dichroic dye and polymerizable liquid crystals. The dichroic dye is preferably used the dichroic dye same to contained in the optically absorptive anisotropic film.

The film coated with the dye having absorption anisotropy is preferably a thin film, but if the film is too thin, the strength tends to be reduced, and the processability tends to be inferior. The thickness of the film is usually 20 μm or less, preferably 5 μm or less, more preferably 0.5 to 3 μm.

Examples of the film coated with the dye having absorption anisotropy include specifically the films described in JP-A-2012-33249, etc.

A polarizing plate is obtained by laminating a transparent protection film on at least one side of the horizontal polarizing film with an adhesive interposed therebetween. The transparent protection film is preferably a transparent film which is the same as the substrate mentioned above.

As a constituent of the three-dimensional optically absorptive anisotropic film, for example, appropriate layers used in constitution of a liquid crystal display device such as an anti-glare layer, an anti-reflection layer, an anti-static layer, a light diffusion controlling layer, a brightness improving layer, a reflection layer and a semi-transmitting layer can be used in addition to the present optically absorptive anisotropic film and the horizontal polarizing film.

EXAMPLES

Hereinafter, the present invention will be described further in detail with reference to examples. In the examples, "%" and "part (s)" mean % by mass and parts by mass unless otherwise specified.

Example 1

Production of Optically Absorptive Anisotropic Composition

An optically absorptive anisotropic composition was obtained by mixing the following components and stirring the mixture at 80° C. for 1 hour. As a dichroic dye, the azo-based dye described in Examples of JP-A-2013-101328 was used. Polymerizable liquid crystals represented by the formulas (1-6) and (1-7) were synthesized according to the method described in lub et al., Reel. Trav. Chim. Pays-Bas, 115, 321-328 (1996). Polymerizable liquid crystals:

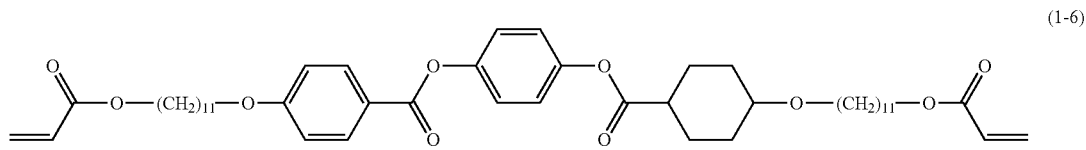
(1-6)

75 Parts

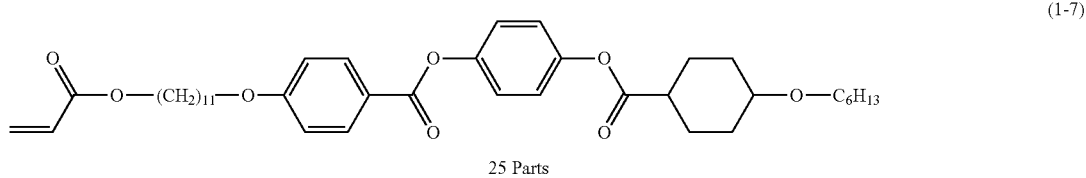
(1-7)

25 Parts

Dichroic Dye 1:

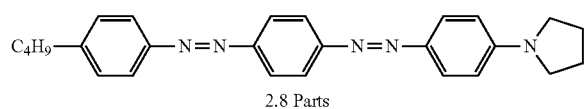

2.8 Parts

Polymerization Initiator;

| | |
|---|---|
| 2-Dimethylamino-2-benzyl-1-(4-morpholinophenyl)butan-1-one (Irgacure 369; manufactured by Ciba Specialty Chemicals | 6 parts |
| Leveling agent; Polyacrylate compound (BYK-361N; manufactured by BYK-Chemie) | 0.3 parts |
| Solvent; o-xylene | 250 parts |

[Measurement of Phase Transition Temperature of Polymerizable Liquid Crystals]

A phase transition temperature was confirmed by texture observation with a polarizing microscope (BX-51, manufactured by Olympus Corporation), while the compound was heated on a glass substrate with an orientation film formed thereon. While being heated, the polymerizable liquid crystal represented by the formula (1-6) exhibited a smectic A phase from a crystal phase at 95° C., caused phase transition to a nematic phase at 111° C., and to an isotropic liquid phase at 113° C. While being cooled, it was confirmed that the compound caused phase transition to a nematic phase at 112° C., to a smectic A phase at 110° C., and to a smectic B phase at 94° C. While being heated, the polymerizable liquid crystal represented by the formula (1-7) exhibited a smectic A phase from a crystal phase at 81° C., caused phase transition to a nematic phase at 121° C., and to an isotropic liquid phase at 137° C. While being cooled, it was confirmed that the compound caused phase transition to a nematic phase at 133° C., to a smectic A phase at 118° C., and to a smectic B phase at 78° C. In the same manner, a phase transition temperature of a thermotropic nematic liquid crystal LC242 manufactured by BASF was confirmed by texture observation. The LC242 exhibited a nematic phase and did not exhibit a smectic phase.

[Production of Optically Absorptive Anisotropic Film]

After the optically absorptive anisotropic composition was coated on a 50 mm×50 mm glass using a spin coater, the glass was dried in a drying oven set at 110° C. for 1 minute, to thereby obtain a dried coating layer in which the polymerizable liquid crystals and the dichroic dye were oriented. After this dried coating layer was naturally cooled to room temperature, the dried coating layer was irradiated with ultraviolet rays (under nitrogen atmosphere, wavelength: 365 nm, integrated quantity of light at a wavelength of 365 nm: 1000 mJ/cm$^2$) using a high pressure mercury lamp (Unicure VB-15201BY-A, manufactured by USHIO Inc.), to thereby polymerize the polymerizable liquid crystals so that an optically absorptive anisotropic film 1 was obtained.

[Evaluation of Optically Absorptive Anisotropic Film]
[Measurement of Three-Dimensional Absorbance]

The absorbance of the optically absorptive anisotropic film 1 was measured as follows.

A three-dimensional absorbance at a wavelength exhibiting local maximum absorption was measured in a wavelength range of 2 nm step 380 to 680 nm by a double beam method using a device in which a holder with a prism polarizer is attached to a spectrophotometer (UV-3150, manufactured by Shimadzu Corporation). The three-dimensional absorbance referred to herein is an absorbance in each direction to linearly polarized light (Ax, Ay, Az), when an arbitrary direction in a film plane is defined as an x-axis, a direction orthogonal to the x-axis in the film plane is defined as a y-axis, and the thickness direction of the film is defined as a z-axis. Specifically, measurement was conducted by rotating a sample around the linearly polarized light as measurement light. The absorbance in the z direction is difficult to be measured due to light incidence from the sample side plane under definition. Hence, the absorbance in the Az direction was estimated by measurement with tilting the x-y plane of the sample by 30° and 60° relative to the vibration plane of the linearly polarized light as measurement light.

Specifically, Ax (z=30) and Ax (z=60) were measured in such a manner that the same linearly polarized light as that when Ax was measured was made incident in the state where the sample was rotated by 30° and 60° with inclusion of the y-axis, and similarly, Ay (z=30) and Ay (z=60) were measured in such a manner that the same linearly polarized light as that when Ay was measured was made incident in the state where the sample was rotated by 30° and 60° with inclusion of the x-axis.

When the x-y plane has no absorption anisotropy, that is, when Ax and Ay are equal, Ax (z=30)=Ay (z=30) and Ax (z=60)=Ay (z=60) are satisfied, so that Ax (z=30) and Ay (z=30) were defined as A(z=30), and Ax (z=60) and Ay (z=60) were defined as A(z=60).

That is, when the relationship of A(z=30)<A(z=60) is satisfied, the relationship of A(z=30)<A(z=60)<A(z=90)=Az is satisfied. Further, when A(z=30)>(Ax+Ay)/2 or A(z=60)>(Ax+Ay)/2 is satisfied, the formula (1) is necessarily satisfied.

$$Az>(Ax+Ay)/2 \quad (1)$$

The sample of Example 1 was measured, and as a result, the three-dimensional absorbance at a wavelength of 526 nm as the local maximum absorption wavelength was Ax=0.029, Ay=0.029, A(z=30)=0.146, and A(z=60)=0.502.

That is, the optically absorptive anisotropic film 1 the formulas (1), (2) and (3) as follows:

$$Az>A(z=60)>A(z=30)>(Ax+Ay)/2 \quad (1)$$

$$Ax(z=60)/Ax=17.3>5 \quad (2)$$

$$Ay(z=60)/Ay=17.3>5 \quad (3).$$

[Measurement of Film Thickness]

When the thickness of a liquid crystal cured film in the optically absorptive anisotropic film 1 was measured using a laser microscope (LEXT, manufactured by Olympus Corporation), it was 1.7 μm.

Example 2

An optically absorptive anisotropic film 2 was made in the same manner as in Example 1 except that a dichroic dye 2 used in place of the dichroic dye 1.

Dichroic dye 2

$C_4H_9$—[thienothiazole]—N=N—[phenyl]—N=N—[phenyl]—N($C_3H_7$)($C_3H_7$)

2.8 parts

[Measurement of Three-Dimensional Absorbance]

The three-dimensional absorbance of the optically absorptive anisotropic film 2 was measured in the same manner as in Example 1, and as a result, the three-dimensional absorbance at a wavelength of 606 nm as the local maximum absorption wavelength was Ax=0.023, Ay=0.023, A(z=30)=0.134, and A(z=60)=0.417.

That is, the optically absorptive anisotropic film 2 the formulas (1), (2) and (3) as follows:

$$Az>A(z=60)>A(z=30)>(Ax+Ay)/2 \quad (1)$$

$$Ax(z=60)/Ax=18.1>5 \quad (2)$$

$$Ay(z=60)/Ay=18.1>5 \quad (3).$$

[Measurement of Film Thickness]

When the thickness of a liquid crystal cured film in the optically absorptive anisotropic film 2 was measured using a laser microscope (LEXT, manufactured by Olympus Corporation), it was 1.6 μm.

Example 3

An optically absorptive anisotropic film 3 was made in the same manner as in Example 1 except that a dichroic dye 3 used in place of the dichroic dye 1.

Dichroic dye 3

$C_4H_9$—[phenyl]—N=N—[thienothiazole]—N=N—[phenyl]—N($C_2H_5$)($C_2H_5$)

2.8 parts

[Measurement of Three-Dimensional Absorbance]

The three-dimensional absorbance of the optically absorptive anisotropic film 3 was measured in the same manner as in Example 1, and as a result, the three-dimensional absorbance at a wavelength of 620 nm as the local maximum absorption wavelength was Ax=0.050, Ay=0.050, A(z=30)=0.226, and A(z=60)=0.647.

That is, the optically absorptive anisotropic film 3 satisfies the formulas (1), (2) and (3) as follows:

$$Az>A(z=60)>A(z=30)>(Ax+Ay)/2 \quad (1)$$

$$Ax(z=60)/Ax=12.9>5 \quad (2)$$

$$Ay(z=60)/Ay=12.9>5 \quad (3).$$

[Measurement of Film Thickness]

When the thickness of a liquid crystal cured film in the optically absorptive anisotropic film 3 was measured using a laser microscope (LEXT, manufactured by Olympus Corporation), it was 1.8 μm.

Example 4

An optically absorptive anisotropic film 4 was made in the same manner as in Example 1 except that a dichroic dye 4 used in place of the dichroic dye 1.

Dichroic dye 4

$C_4H_9$—[phenyl]—N=N—[phenyl]—N=N—[phenyl]—$OC_3H_7$ 2.8 Parts

[Measurement of Three-Dimensional Absorbance]

The three-dimensional absorbance of the optically absorptive anisotropic film 4 was measured in the same manner as in Example 1, and as a result, the three-dimensional absorbance at a wavelength of 402 nm as the local maximum absorption wavelength was Ax=0.086, Ay=0.086, A(z=30)=0.193, and A(z=60)=0.525.

That is, the optically absorptive anisotropic film 4 the formulas (1), (2) and (3) as follows:

$$Az>A(z=60)>A(z=30)>(Ax+Ay)/2 \quad (1)$$

$$Ax(z=60)/Ax=6.1>5 \quad (2)$$

$$Ay(z=60)/Ay=6.1>5 \quad (3).$$

[Measurement of Film Thickness]

When the thickness of a liquid crystal cured film in the optically absorptive anisotropic film 4 was measured using a laser microscope (LEXT, manufactured by Olympus Corporation), it was 1.7 μm.

Example 5

An optically absorptive anisotropic film 5 was made in the same manner as in Example 1 except that a dichroic dye 5 used in place of the dichroic dye 1.

Dichroic dye 5

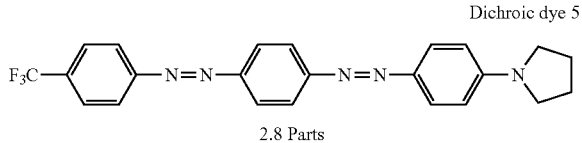 [SMILES: FC(F)(F)c1ccc(N=Nc2ccc(N=Nc3ccc(N4CCCC4)cc3)cc2)cc1]

2.8 Parts

[Measurement of Three-Dimensional Absorbance]

The three-dimensional absorbance of the optically absorptive anisotropic film 5 was measured in the same manner as in Example 1, and as a result, the three-dimensional absorbance at a wavelength of 546 nm as the local maximum absorption wavelength was Ax=0.020, Ay=0.020, A(z=30)=0.105, and A(z=60)=0.333.

That is, the optically absorptive anisotropic film 5 the formulas (1), (2) and (3) as follows:

$$Az > A(z=60) > A(z=30) > (Ax+Ay)/2 \tag{1}$$

$$Ax(z=60)/Ax = 16.7 > 5 \tag{2}$$

$$Ay(z=60)/Ay = 16.7 > 5 \tag{3}$$

[Measurement of Film Thickness]

When the thickness of a liquid crystal cured film in the optically absorptive anisotropic film 5 was measured using a laser microscope (LEXT, manufactured by Olympus Corporation), it was 1.7 μm.

Example 6

Production of Composition for Forming Orientation Film

Propylene glycol monomethyl ether was added to an orienting polymer to obtain a composition for forming an orientation film. A numerical value in parenthesis as the solid matter concentration of the orienting polymer was converted from the concentration described in delivery specification.

Orienting polymer: Sunever (registered trademark) SE-610 (manufactured by Nissan Chemical Industries, Ltd.) 0.3 parts (1.0%)

Propylene glycol monomethyl ether: 27.7 parts

[Production of Optically Absorptive Anisotropic Film]

A polyethylene terephthalate film (Diafoil T140E25, manufactured by Mitsubishi Plastics, Inc.) was cut into a size of 80×80 mm, and a surface thereof was subjected to corona treatment (AGF-B10, manufactured by Kasuga Electric Works, Ltd.). The film surface subjected to corona treatment was coated with the composition for forming an orientation film using a bar coater, and the product was dried in a drying oven set at 120° C. for 1 to obtain an orientation film. A composition for forming a liquid crystal cured film which was the same as that used in Example 1 was coated on the resulting orientation film using a bar coater, and then the product was dried in a drying oven set at 110° C. for 1 minute, and the composition was irradiated with ultraviolet rays (under nitrogen atmosphere, wavelength: 365 nm, integrated quantity of light at a wavelength of 365 nm: 1000 mJ/cm²) using a high pressure mercury lamp (Unicure VB-15201BY-A, manufactured by USH10 Inc.), to thereby polymerize the polymerizable liquid crystals so that an optically absorptive anisotropic film 6 was obtained.

[Measurement of Three-Dimensional Absorbance]

The three-dimensional absorbance of the optically absorptive anisotropic film 5 was measured in the same manner as in Example 1, and as a result, the three-dimensional absorbance at a wavelength of 526 nm as the local maximum absorption wavelength was Ax=0.040, Ay=0.040, A(z=30)=0.184, and A(z=60)=0.602.

That is, the optically absorptive anisotropic film 6 the formulas (1), (2) and (3) as follows.

$$Az > A(z=60) > A(z=30) > (Ax+Ay)/2 \tag{1}$$

$$Ax(z=60)/Ax = 15.1 > 5 \tag{2}$$

$$Ay(z=60)/Ay = 15.1 > 5 \tag{3}$$

[Measurement of Film Thickness]

When the thickness of a liquid crystal cured film in the optically absorptive anisotropic film 6 was measured using a laser microscope (LEXT, manufactured by Olympus Corporation), it was 2.2 μm.

Example 7

An optically absorptive anisotropic film 7 was made in the same manner as in Example 6 except that the dichroic dye 2 was used in place of the dichroic dye 1.

[Measurement of Three-Dimensional Absorbance]

The three-dimensional absorbance of the optically absorptive anisotropic film 7 was measured in the same manner as in Example 1, and as a result, the three-dimensional absorbance at a wavelength of 608 nm as the local maximum absorption wavelength was Ax=0.032, Ay=0.032, A(z=30)=0.184, and A(z=60)=0.588.

That is, the optically absorptive anisotropic film 7 the formulas (1), (2) and (3) as follows.

$$Az > A(z=60) > A(z=30) > (Ax+Ay)/2 \tag{1}$$

$$Ax(z=60)/Ax = 18.4 > 5 \tag{2}$$

$$Ay(z=60)/Ay = 18.4 > 5 \tag{3}$$

[Measurement of Film Thickness]

When the thickness of a liquid crystal cured film in the optically absorptive anisotropic film 7 was measured using a laser microscope (LEXT, manufactured by Olympus Corporation), it was 2.2 μm.

Example 8

An optically absorptive anisotropic film 8 was made in the same manner as in Example 6 except that the dichroic dye 3 was used in place of the dichroic dye 1.

[Measurement of Three-Dimensional Absorbance]

The three-dimensional absorbance of the optically absorptive anisotropic film 8 was measured in the same manner as in Example 1, and as a result, the three-dimensional absorbance at a wavelength of 622 nm as the local maximum absorption wavelength was Ax=0.078, Ay=0.078, A(z=30)=0.291, and A(z=60)=0.860.

That is, the optically absorptive anisotropic film 8 the formulas (1), (2) and (3) as follows.

$$Az > A(z=60) > A(z=30) > (Ax+Ay)/2 \quad (1)$$

$$Ax(z=60)/Ax = 11.0 > 5 \quad (2)$$

$$Ay(z=60)/Ay = 11.0 > 5 \quad (3)$$

[Measurement of Film Thickness]

When the thickness of a liquid crystal cured film in the optically absorptive anisotropic film 8 was measured using a laser microscope (LEXT, manufactured by Olympus Corporation), it was 2.3 µm.

Comparative Example 1

An optically absorptive anisotropic film 9 was made in the same manner as in Example 2 except that a thermotropic nematic liquid crystal LC242 manufactured by BASF was used in place of the polymerizable liquid crystals (1-6) and (1-7). In this sample, transparency was not obtained and the molecular orientation of the polymerizable liquid crystal as well as that of the dichroic dye were not obtained.

LC242

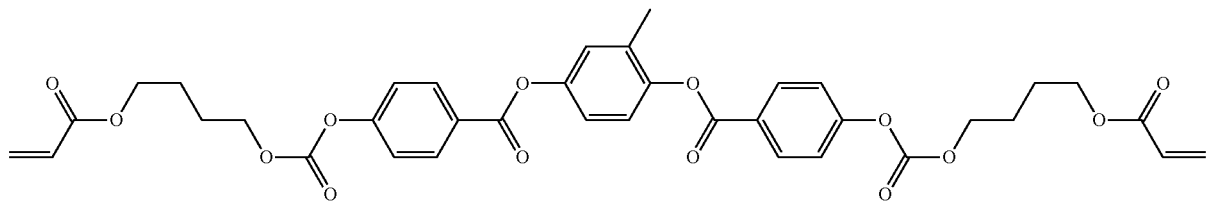

[Measurement of Three-Dimensional Absorbance]

The three-dimensional absorbance of the optically absorptive anisotropic film 9 was measured in the same manner as in Example 1, and as a result, the three-dimensional absorbance at a wavelength of 560 nm as the local maximum absorption wavelength was Ax=0.327, Ay=0.327, A(z=300)=0.317, and A(z=60)=0.312.

That is, the optically absorptive anisotropic film 9 does not satisfy the formulas (1), (2) and (3) as follows.

$$Az < A(z=60) < A(z=30) < (Ax+Ay)/2$$

$$Ax(z=60)/Ax = 1.0$$

$$Ay(z=60)/Ay = 1.0$$

[Measurement of Film Thickness]

When the thickness of a liquid crystal cured film in the optically absorptive anisotropic film 9 was measured using a laser microscope (LEXT, manufactured by Olympus Corporation), it was 1.7 µm.

Comparative Example 2

An optically absorptive anisotropic film 10 was made in the same mummer as in Example 6 except that a thermotropic nematic liquid crystal LC242 (manufactured by BASF) was used in place of the polymerizable liquid crystals (1-6) and (1-7).

LC242

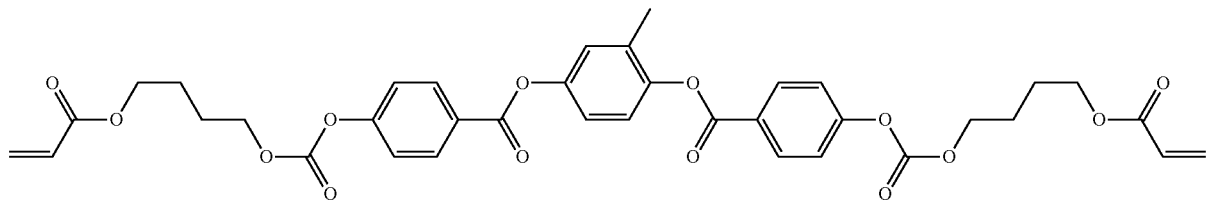

[Measurement of Three-Dimensional Absorbance]

The three-dimensional absorbance of the optically absorptive anisotropic film 10 was measured in the same manner as in Example 1, and as a result, the three-dimensional absorbance at a wavelength of 488 nm as the local maximum absorption wavelength was Ax=0.072, Ay=0.072, A(z=30)=0.133, and A(z=60)=0.275.

That is, the optically absorptive anisotropic film 10 the formula (1), but does not satisfy the formulas (2) and (3), as follows.

$$Az > A(z=60) > A(z=30) > (Ax+Ay)/2$$

$$Ax(z=60)/Ax = 3.8$$

$$Ay(z=60)/Ay = 3.8$$

[Measurement of Film Thickness]

When the thickness of a liquid crystal cured film in the optically absorptive anisotropic film 10 was measured using a laser microscope (LEXT, manufactured by Olympus Corporation), it was 2.1 μm.

Comparative Example 3

An optically absorptive anisotropic film 11 was made in the same manner as in Example 7 except that a thermotropic nematic liquid crystal LC242 (manufactured by BASF) was used in place of the polymerizable liquid crystals (1-6) and (1-7).

LC242

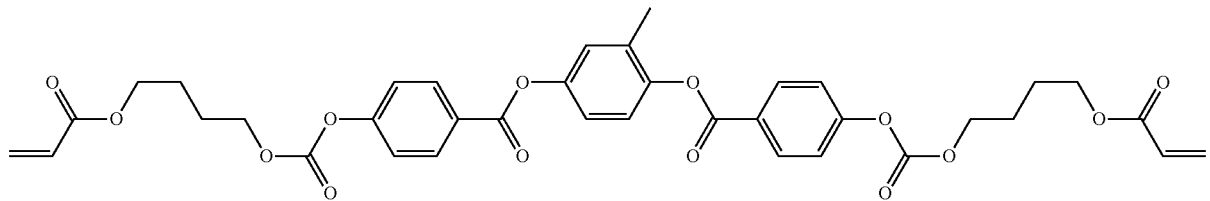

[Measurement of Three-Dimensional Absorbance]

The three-dimensional absorbance of the optically absorptive anisotropic film 11 was measured in the same manner as in Example 1, and as a result, the three-dimensional absorbance at a wavelength of 560 nm as the local maximum absorption wavelength was Ax=0.071, Ay=0.071, A(z=30)=0.125, and A(z=60)=0.275.

That is, the optically absorptive anisotropic film 10 the formula (1), but does not satisfy the formulas (2) and (3), as follows.

$$Az > A(z=60) > A(z=30) > (Ax+Ay)/2$$

$$Ax(z=60)/Ax = 3.9$$

$$Ay(z=60)/Ay = 3.9$$

[Measurement of Film Thickness]

When the thickness of a liquid crystal cured film in the optically absorptive anisotropic film 11 was measured using a laser microscope (LEXT, manufactured by Olympus Corporation), it was 2.1 μm.

Comparative Example 4

An optically absorptive anisotropic film 12 was made in the same manner as in Example 8 except that a thermotropic nematic liquid crystal LC242 (manufactured by BASF) was used in place of the polymerizable liquid crystals (1-6) and (1-7).

LC242

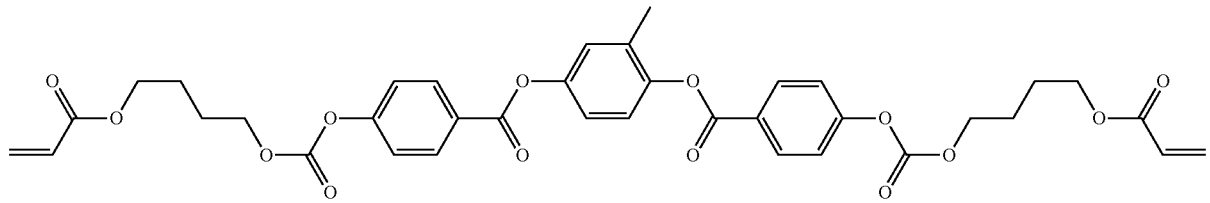

[Measurement of Three-Dimensional Absorbance]

The three-dimensional absorbance of the optically absorptive anisotropic film 12 was measured in the same manner as in Example 1, and as a result, the three-dimensional absorbance at a wavelength of 594 nm as the local maximum absorption wavelength was Ax=0.133, Ay=0.133, A(z=30)=0.220, and A(z=60)=0.460.

That is, the optically absorptive anisotropic film 12 the formula (1), but does not satisfy the formulas (2) and (3), as follows.

$$Az > A(z=60) > A(z=30) > (Ax+Ay)/2$$

$$Ax(z=60)/Ax=3.5$$

$$Ay(z=60)/Ay=3.5$$

[Measurement of Film Thickness]

When the thickness of a liquid crystal cured film in the optically absorptive anisotropic film 12 was measured using a laser microscope (LEXT, manufactured by Olympus Corporation), it was 2.1 μm.

Example 9

An optically absorptive anisotropic film 13 was made in the same manner as in Example 6 except that the dichroic dye 1, the dichroic dye 3 and the dichroic dye 4 were used simultaneously in place of the dichroic dye 1.

[Measurement of Three-Dimensional Absorbance]

The three-dimensional absorbance of the optically absorptive anisotropic film 13 was measured in the same manner as in Example 1, and as a result, the local maximum absorption derived from each of three kinds of dyes was obtained.

First Absorption:

The three-dimensional absorbance at a wavelength of 400 nm was Ax=0.115, Ay=0.115, A(z=30)=0.274, and A(z=60)=0.692.

That is, the optically absorptive anisotropic film 13 satisfies the formulas (1), (2) and (3) as follows.

$$Az > A(z=60) > A(z=30) > (Ax+Ay)/2 \quad (1)$$

$$Ax(z=60)/Ax=6.0>5 \quad (2)$$

$$Ay(z=60)/Ay=6.0>5 \quad (3)$$

Second Absorption:

The three-dimensional absorbance at a wavelength of 526 was Ax=0.062, Ay=0.062, A(z=30)=0.220, and A(z=60)=0.639.

That is, the optically absorptive anisotropic film 13 the formulas (1), (2) and (3) as follows.

$$Az > A(z=60) > A(z=30) > (Ax+Ay)/2 \quad (1)$$

$$Ax(z=60)/Ax=10.2>5 \quad (2)$$

$$Ay(z=60)/Ay=10.2>5 \quad (3)$$

Third Absorption:

The three-dimensional absorbance at a wavelength of 622 was Ax=0.049, Ay=0.049, A(z=30)=0.187, and A(z=60)=0.468.

That is, the optional absorption anisotropic film 13 the formulas (1), (2) and (3) as follows.

$$Az > A(z=60) > A(z=30) > (Ax+Ay)/2 \quad (1)$$

$$Ax(z=60)/Ax=11.3>5 \quad (2)$$

$$Ay(z=60)/Ay=11.3>5 \quad (3)$$

[Measurement of Film Thickness]

When the thickness of a liquid crystal cured film in the optically absorptive anisotropic film 13 was measured using a laser microscope (LEXT, manufactured by Olympus Corporation), it was 2.3 μm.

Example 10

Production of Polarizing Plate

Figure 3:
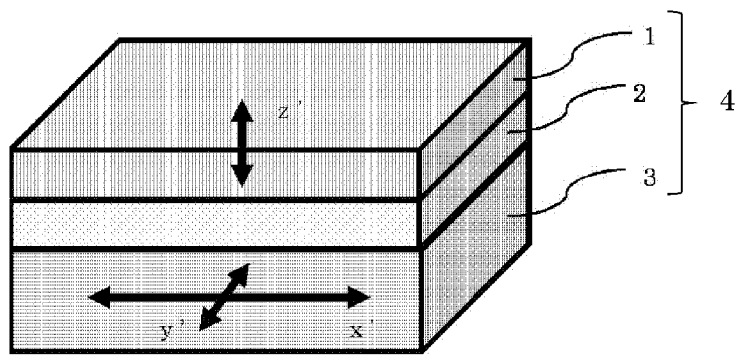
FIG. 3 is a perspective view of one example of a three-dimensional optically absorptive anisotropic film.

A polyvinyl alcohol film having an average degree of polymerization of about 2,400, a degree of saponification of 99.9 mol % or more and a thickness of 75 μm was immersed in pure water at 30° C., and then immersed in an aqueous solution having a weight ratio of iodine/potassium iodide/water of 0.02/2/100 at 30° C. to conduct iodine dyeing (iodine dyeing step). The polyvinyl alcohol film which had passed through the iodine dyeing step was immersed in an aqueous solution having a weight ratio of potassium iodide/boric acid/water of 12/5/100 at 56.5° C. to conduct boric acid treatment (boric acid treatment step). The polyvinyl alcohol film which had passed through the boric acid treatment step was washed with pure water at 8° C., and dried at 65° C. to obtain a horizontal polarizing film (thickness after stretching: 27 μm) in which iodine is adsorption-oriented on polyvinyl alcohol. Thereupon, stretching was performed in the iodine dyeing step and the boric acid treatment step. The total stretching ratio in such stretching was 5.3 times. The resulting horizontal polarizing film and a saponification-treated triacetyl cellulose film (KC4UYTAC, manufactured by Konica Minolta, Inc., 40 μm) were stuck together by a nip roll with an aqueous adhesive interposed therebetween. The resulting stuck product was dried at 60° C. for 2 minutes while the tension of the product was retained at 430 N/m, to obtain a polarizing plate (1) having the triacetyl cellulose film as a protection film on one side. The aqueous adhesive was prepared by adding 3 parts of carboxyl group-modified polyvinyl alcohol (Kuraray Poval KL318, manufactured by Kuraray Co., Ltd.) and 1.5 parts of a water-soluble polyamide epoxy resin (Sumirez resin 650, manufactured by Sumika Chemtex Co., Ltd., aqueous solution having solid matter concentration of 30%) to 100 parts of water. This polarizing plate and a liquid crystal cured film side of the optically absorptive anisotropic film 13 obtained in Example 9 were stuck together with a pressure-sensitive adhesive interposed therebetween to make a three-dimensional optically absorptive anisotropic film as shown in FIG. 3.

[Measurement of Three-Dimensional Absorbance]

The three-dimensional absorbance of the resulting composite polarizing plate was measured in the same manner as in Example 1. The three-dimensional absorbance thereupon is the absorbance in each direction (Ax', Ay', Az'), when the absorption axis of the polarizing plate is defined as x', the transmission axis direction of the polarizing plate is defined as y', and the film thickness direction of the liquid crystal cured film is defined as z'.

The magnitude correlation of Ax', Ay' and Az' was determined by measuring Ax' and Ax' (z=60), as well as Ay' and Ay' (z=60).

Second Absorption:

The three-dimensional absorbance at a wavelength of 526 nm was Ax'=3.158, Ay'=0.065, Ay'(z=60)=0.614. That is, the relationship of Ay'(z=60)=Ay' cos 60°+Az' sin 60° is satisfied, it is calculated that Az' is about 0.671. Hence, it was confirmed that the formula (4) is satisfied.

$$Ax' > Az' > Ay' \quad (4)$$

Figure 4:
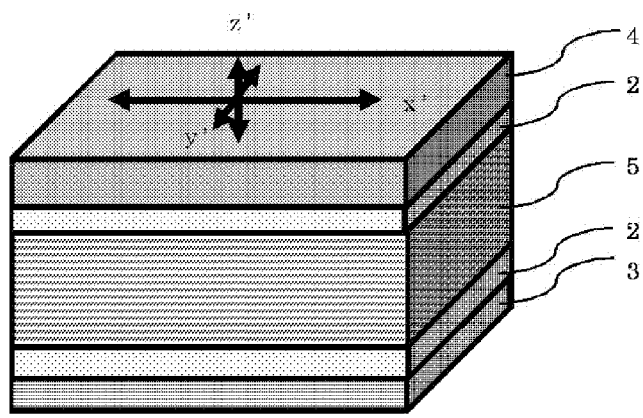
FIG. 4 is a perspective view of a liquid crystal display device having the three-dimensional optically absorptive anisotropic film.

As shown in FIG. 4, the polarizing plate was stuck to the backside of a liquid crystal panel with a pressure-sensitive adhesive interposed therebetween, and the three-dimensional optically absorptive anisotropic film was stuck to the front side of the liquid crystal panel with a pressure-sensitive adhesive interposed therebetween so that the polarizing plate side became a panel side. When an appearance was evaluated, clear visibility was retained from the front direction, while visibility from a transverse direction was reduced, and it was confirmed that the peep preventing function was obtained.

The optically absorptive anisotropic film of the present invention is useful as a thin material which can be conveniently produced and which imparts a more effective peep preventing function to a display of a cellular phone, bank ATM, etc.

What is claimed is:

1. An optically absorptive anisotropic film comprising a dichroic dye and a liquid crystalline compound, wherein, when an arbitrary direction in the film plane is defined as an x-axis, the axis orthogonal to the x-axis in the film plane is defined as a y-axis and the axis orthogonal to the x-axis and the y-axis is defined as a z-axis, the light absorbances of the film satisfy the formulas (1), (2) and (3):

$$Az > (Ax+Ay)/2 \qquad (1)$$

$$Ax(z=60)/Ax > 5 \qquad (2)$$

$$Ay(z=60)/Ay > 5 \qquad (3)$$

wherein Ax, Ay, Az, Ax (z=60) and Ay (z=60) are absorbances at a local maximum absorption wavelength of the dichroic dye contained in the film;

Ax represents an absorbance of linearly polarized light vibrating in the direction of the x-axis;

Ay represents an absorbance of linearly polarized light vibrating in the direction of the y-axis;

Az represents an absorbance of linearly polarized light vibrating in the direction of the z-axis;

Ax (z=60) represents an absorbance of the linearly polarized light vibrating in the direction of the x-axis in the state of the film rotated by 60° around the y-axis;

Ay (z=60) represents an absorbance of the linearly polarized light vibrating in the direction of the y-axis in the state the film rotated by 60O around the x-axis.

2. The optically absorptive anisotropic film according to claim 1, wherein the liquid crystalline compound forms a smetic liquid crystal phase.

3. The optically absorptive anisotropic film according to claim 1, wherein the liquid crystalline compound forms a high order smectic liquid crystal phase.

4. The optically absorptive anisotropic film according to claim 1, wherein the optically absorptive anisotropic film exhibits a Bragg peak in x-ray diffraction measurement.

5. The optically absorptive anisotropic film according to claim 1, wherein the local maximum absorption wavelength of the dichroic dye contained in the optily absorptive anisotropic film is in a wavelength range of 500 to 600 nm.

6. The optically absorptive anisotropic film according to claim 1, wherein the optically absorptive anisotropic film satisfies the formulas (4) and (5), $$Ax(z60)/Ax > 10 \qquad (4)$$

$$Ay1z-60)/Ay > 10 \qquad (5).$$

7. The optically absorptive anisotropic film according to claim 1, wherein the optically absorptive anisotropic film comprising at least three dichroic dyes differing in a local maximum absorption wavelength.

8. The optically absorptive anisotropic film according to claim 1, wherein the optically absorptive anisotropic film has a thickness of 5 μm or less.

9. An optical film comprising the optically absorptive anisotropic film according to claim 1 and a substrate.

10. The optical film according to claim 9, wherein the optical film has no orientation film between the optically absorptive anisotropic film and the substrate.

11. A method for producing the optical film according to claim 9, the method comprising the following steps of (1), (2), (3) and (4) to be performed in this order:
(1) a step of forming a coating layer by coating a substrate with a composition comprising the liquid crystalline compound, the dichroic dye and a solvent;
(2) a step of forming a dried layer by removing the sol vent from the coating layer;
(3) a step of developing a liquid crystal phase by cooling the dried layer; and
(4) a step of curing the liquid crystalline compound by applying active energy rays.

12. The method according to claim 11, wherein an elongated film is used as the substrate and the optical film is produced continuously.

13. A three-dimensional optically absorptive anisotropic film in which the optically absorptive anisotropic film according to claim 1 is laminated together with a horizontal polarizing film, wherein,
when an absorption axis of the horizontal polarizing film is defined as an x'-axis, a transmission axis of the horizontal polarizing film is defined as a y'-axis and the axis orthogonal to the x'-axis and the y'-axis is defined as a z'-axis, the three-dimensional optically absorptive anisotropic film satisfies the formula (6):

$$Ax' > Az' > Ay' \qquad (6)$$

wherein Ax', Ay' and Az' are an absorbances at a local maximum absorption wavelength of the dichroic dye contained in the optically absorptive anisotropic film;

Ax' represents an absorbance of linearly polarized light vibrating in the direction of the x'-axis;

Ay' represents an absorbance of linearly polarized light vibrating in the direction of the y'-axis; and Az' represents an absorbance of linearly polarized light vibrating in the direction of the z'-axis.

14. The three-dimensional optically absorptive anisotropic film according to claim 13, wherein the horizontal polarizing film comprises a polyvinyl alcohol and a dichroic dye.

15. The three-dimensional optically absorptive anisotropic film according to claim 13, wherein the horizontal polarizing film comprises a dichroic dye and a liquid crystalline compound, or comprises a dichroic dye having liquid crystalline properties.

16. The three-dimensional optically absorptive anisotropic film according to claim 13, wherein the optically absorptive anisotropic film is laminated on the horizontal polarizing film via a pressure-sensitive adhesive or an adhesive.

* * * * *